(12) United States Patent
Shen et al.

(10) Patent No.: US 12,477,064 B2
(45) Date of Patent: **\*Nov. 18, 2025**

(54) CALL PROCESSING METHOD, CALL PROCESSING APPARATUS, AND RELATED DEVICE

(71) Applicant: HUAWEI TECHNOLOGIES CO., LTD., Shenzhen (CN)

(72) Inventors: Guangjie Shen, Xi'an (CN); Yunhua Zhang, Xi'an (CN); Ye Zhu, Xi'an (CN); Yigang Jia, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 195 days.

This patent is subject to a terminal disclaimer.

(21) Appl. No.: 18/346,962

(22) Filed: Jul. 5, 2023

(65) Prior Publication Data

US 2023/0353673 A1    Nov. 2, 2023

Related U.S. Application Data

(63) Continuation of application No. PCT/CN2021/070534, filed on Jan. 6, 2021.

(51) Int. Cl.
*H04M 3/00* (2024.01)
*H04M 3/493* (2006.01)
*H04M 3/51* (2006.01)

(52) U.S. Cl.
CPC ......... *H04M 3/493* (2013.01); *H04M 3/5191* (2013.01)

(58) Field of Classification Search
CPC .............................. H04M 3/493; H04M 3/5191
(Continued)

(56) References Cited

U.S. PATENT DOCUMENTS 7,117,001 B2 * 10/2006 Lin ....................... H04W 76/10
                                                            455/511
7,539,484 B2 *  5/2009 Roundtree ............. H04W 4/18
                                                            455/414.1
(Continued)

FOREIGN PATENT DOCUMENTS

CN      102196104 A      9/2011
CN      104092838 A     10/2014
(Continued)

OTHER PUBLICATIONS

3GPP TS 24.229 V17.1.0 (Dec. 2020), 3rd Generation Partnership Project; Technical Specification Group Core Network and Terminals; IP multimedia call control protocol based on Session Initiation Protocol (SIP) and Session Description Protocol (SDP); Stage 3 (Release 17), total 1070 pages.

(Continued)

*Primary Examiner* — William J Deane, Jr.
(74) *Attorney, Agent, or Firm* — HAUPTMAN HAM, LLP

(57) ABSTRACT

A call processing method includes: an application server establishes a data channel between the application server and the terminal device when detecting that the terminal device initiates or receives a call service, and obtains first service page information corresponding to the call service. The application server sends the first service page information to the terminal device through the data channel when detecting that the call service is connected, so that the terminal device displays a corresponding UI page on a call screen based on the first service page information. It can be learned that, the application server associates an original call service with an interactive data channel service, and the application server delivers service page information to the (Continued)

terminal device, so that the terminal device can implement an interactive service during a call.

20 Claims, 24 Drawing Sheets

(58) Field of Classification Search
USPC ...... 379/265.01–265.14, 266.01–266.1, 309; 709/227
See application file for complete search history.

(56) References Cited

U.S. PATENT DOCUMENTS

| | | | |
|---|---|---|---|
| 2007/0173237 A1* | 7/2007 | Roundtree | H04W 4/18 455/414.1 |
| 2008/0146256 A1* | 6/2008 | Hawkins | H04L 65/1094 455/566 |
| 2008/0220810 A1* | 9/2008 | Landschaft | H04M 3/493 455/550.1 |
| 2012/0008755 A1* | 1/2012 | Mittal | H04M 3/4931 715/810 |
| 2013/0035079 A1* | 2/2013 | O'Doherty | H04W 76/11 455/414.1 |
| 2014/0106720 A1* | 4/2014 | Mairs | H04M 7/0024 455/415 |
| 2016/0021519 A1 | 1/2016 | Xu | |
| 2016/0127542 A1* | 5/2016 | Kim | H04M 3/42076 455/566 |

FOREIGN PATENT DOCUMENTS

| | | |
|---|---|---|
| CN | 104158985 A | 11/2014 |
| CN | 105721470 A | 6/2016 |
| CN | 109327630 A | 2/2019 |

OTHER PUBLICATIONS

3GPP TS 26.114 V16.5.2 (Mar. 2020), 3rd Generation Partnership Project; Technical Specification Group Services and System Aspects; IP Multimedia Subsystem (IMS); Multimedia Telephony; Media handling and interaction (Release 16), total 446 pages.
Series H: Audiovisual and Multimedia Systems Infrastructure of audiovisual services—Communication procedures. Gateway control protocol: Version 3. H.248.1(Mar. 2013). total 242 pages.
Number authentication access document, http://dev.10086.cn/dev10086/pub/loadAttach?attachId=5CAD5A1050EE4256A0E996572F387776, Nov. 2, 2020, total 18 pages.
Number authentication, https://dev.10086.cn/numIdentific?from=index, Oct. 9, 2024, total 3 pages.
Number authentication ability introduction, https://dev.10086.cn/docInside?contentId=10000067529678, May 12, 2020, total 2 pages.
International Search Report issued in corresponding International Application No. PCT/CN2021/070534, dated Sep. 15, 2021, pp. 1-9.
Extended European Search Report issued in corresponding European Application No. 21916754.1, dated Jan. 2, 2024, pp. 1-8.

* cited by examiner

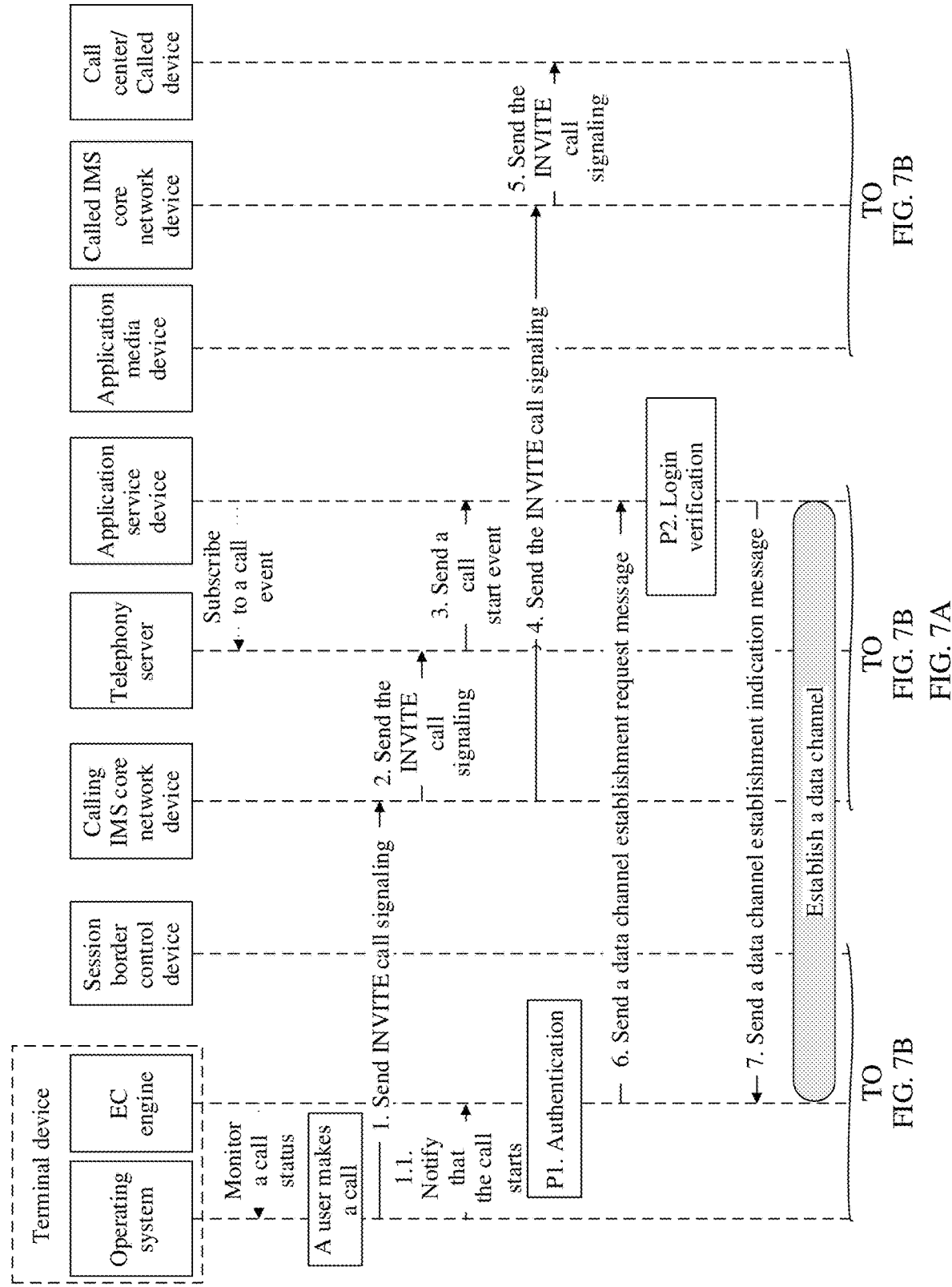

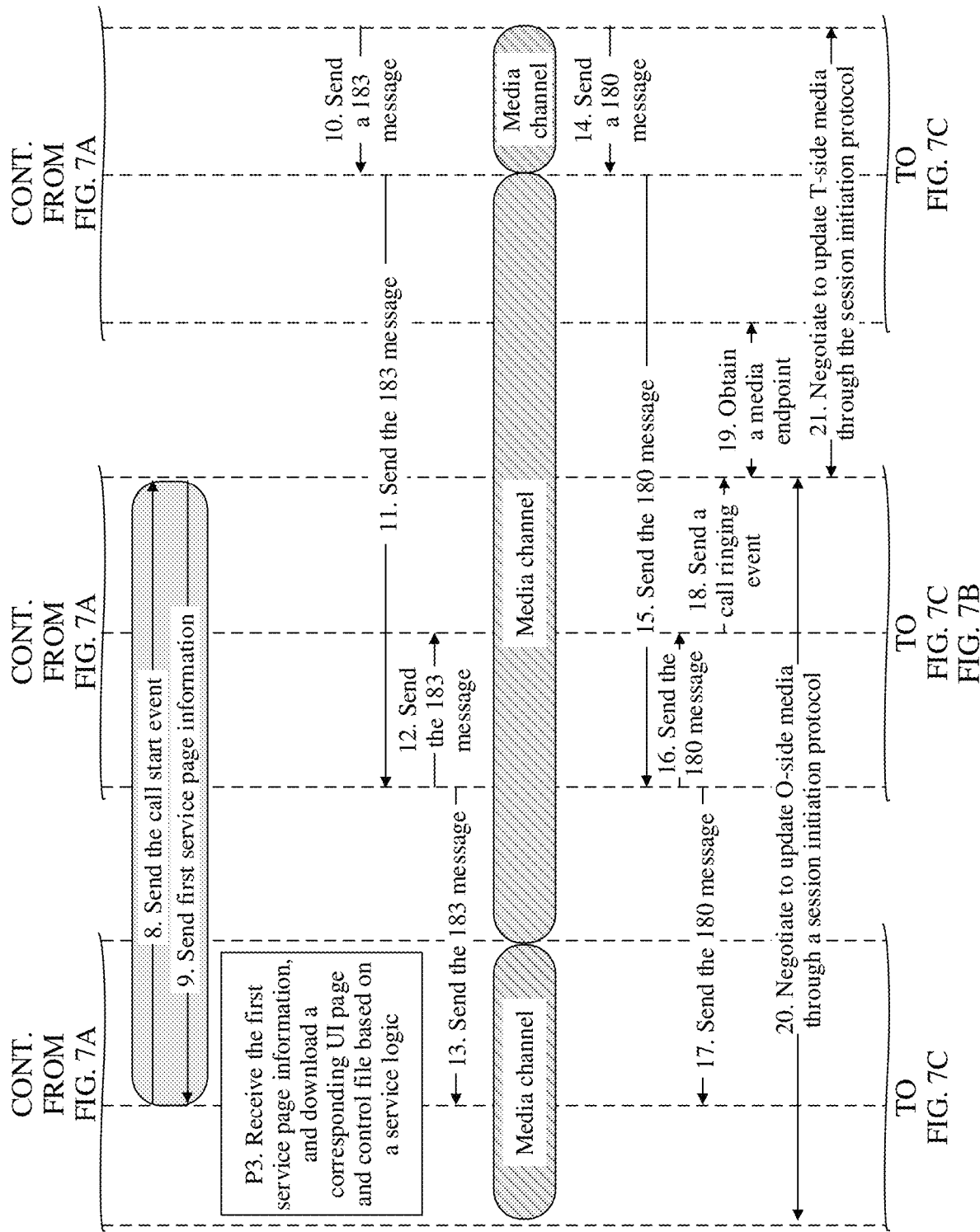

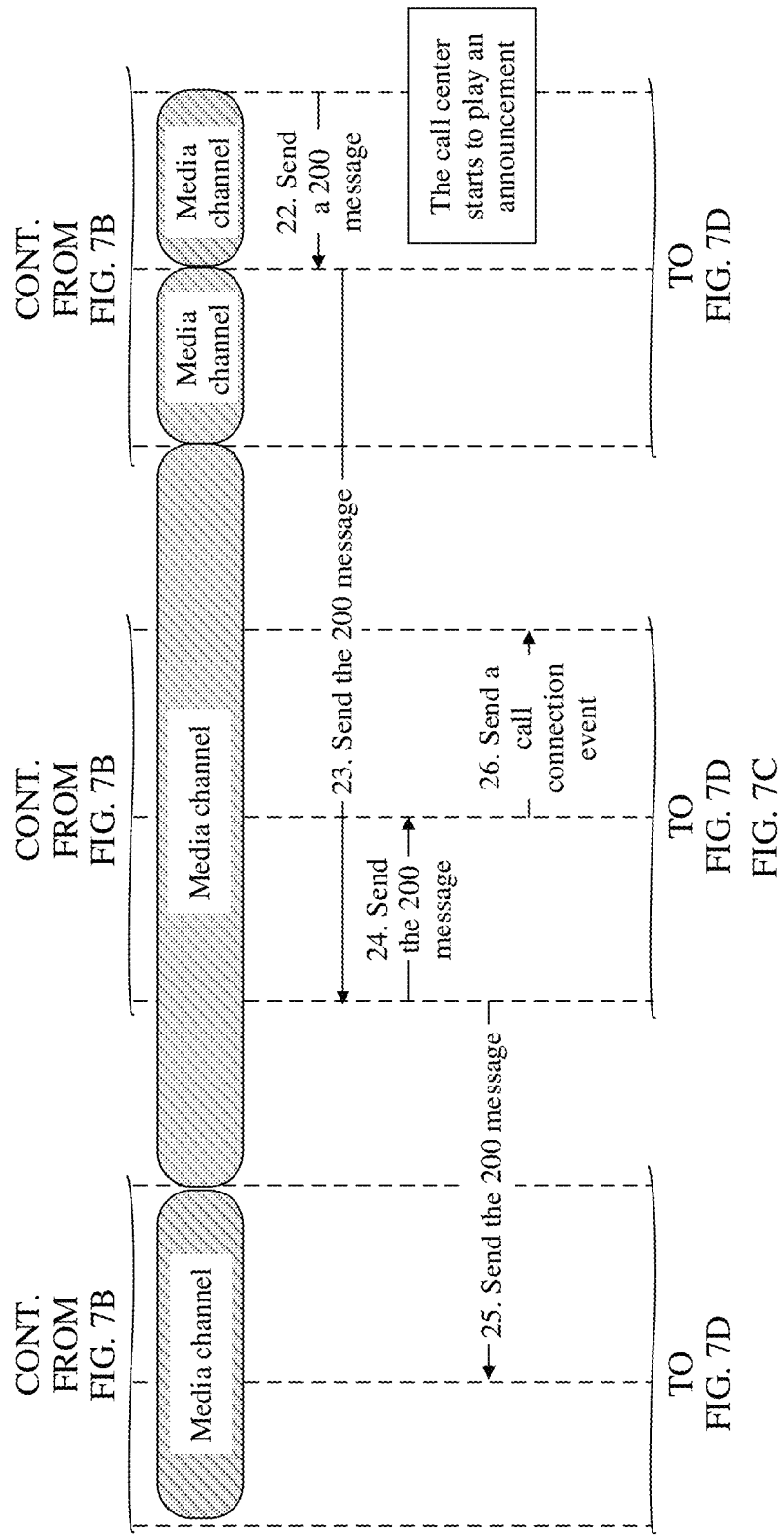

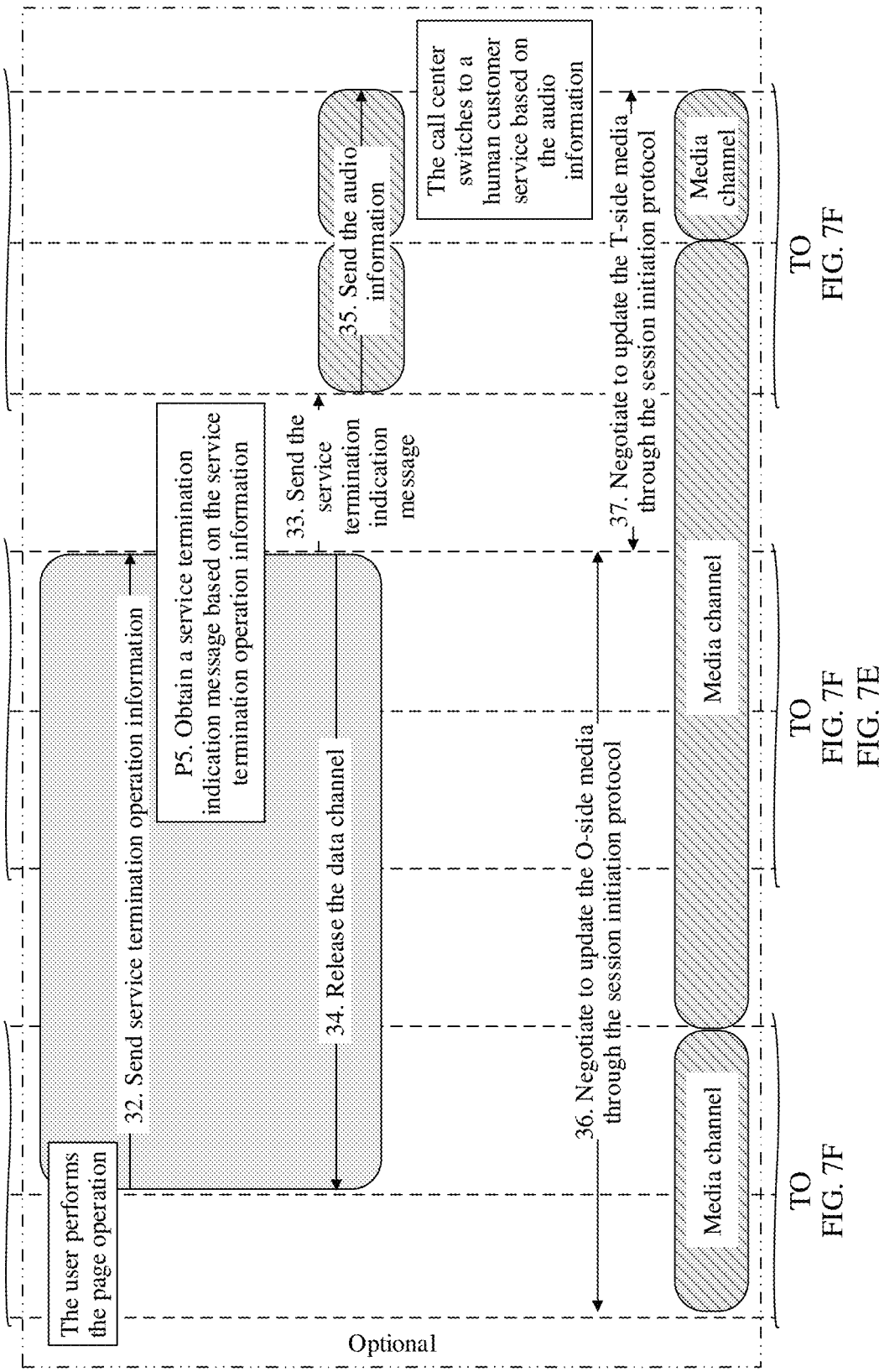

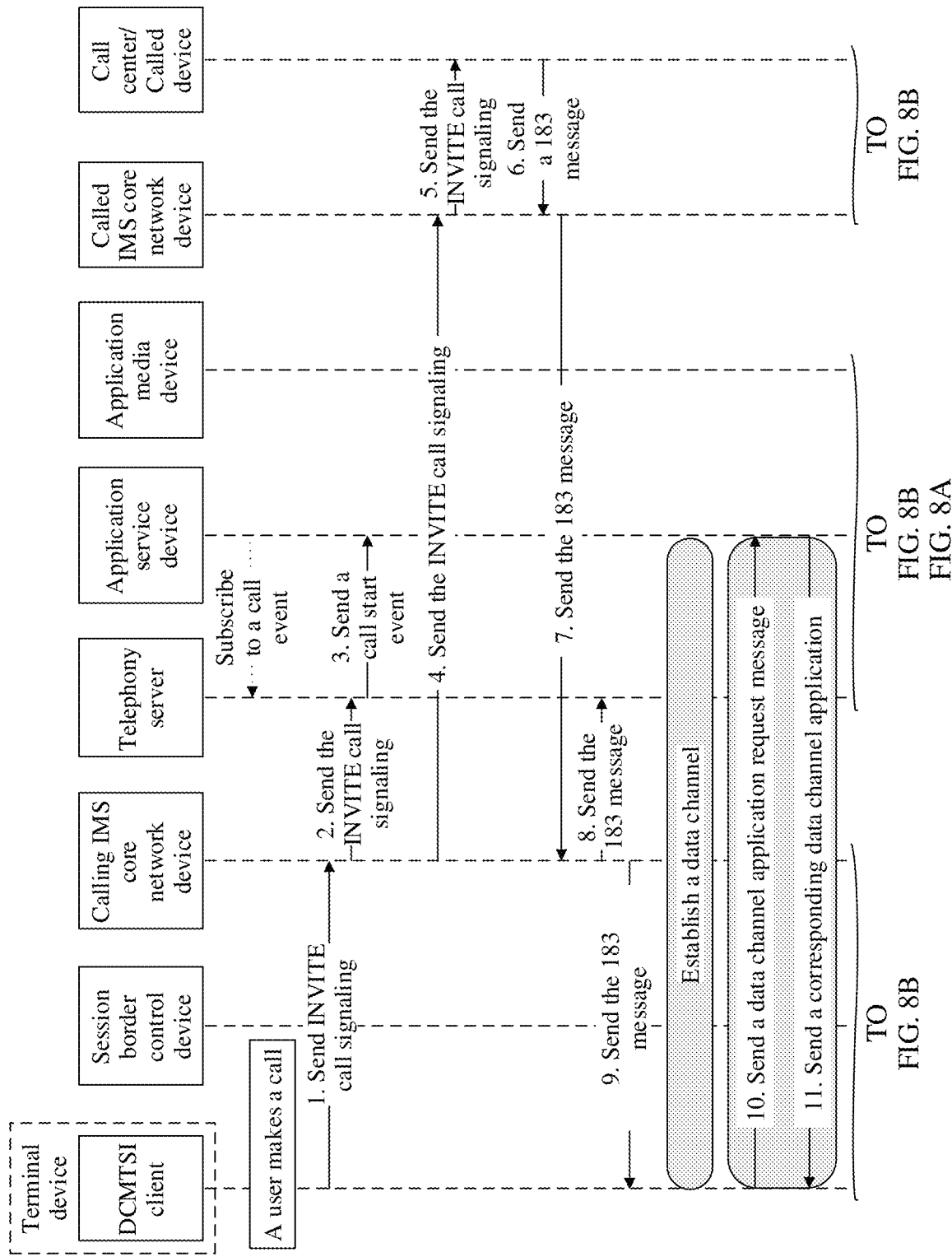

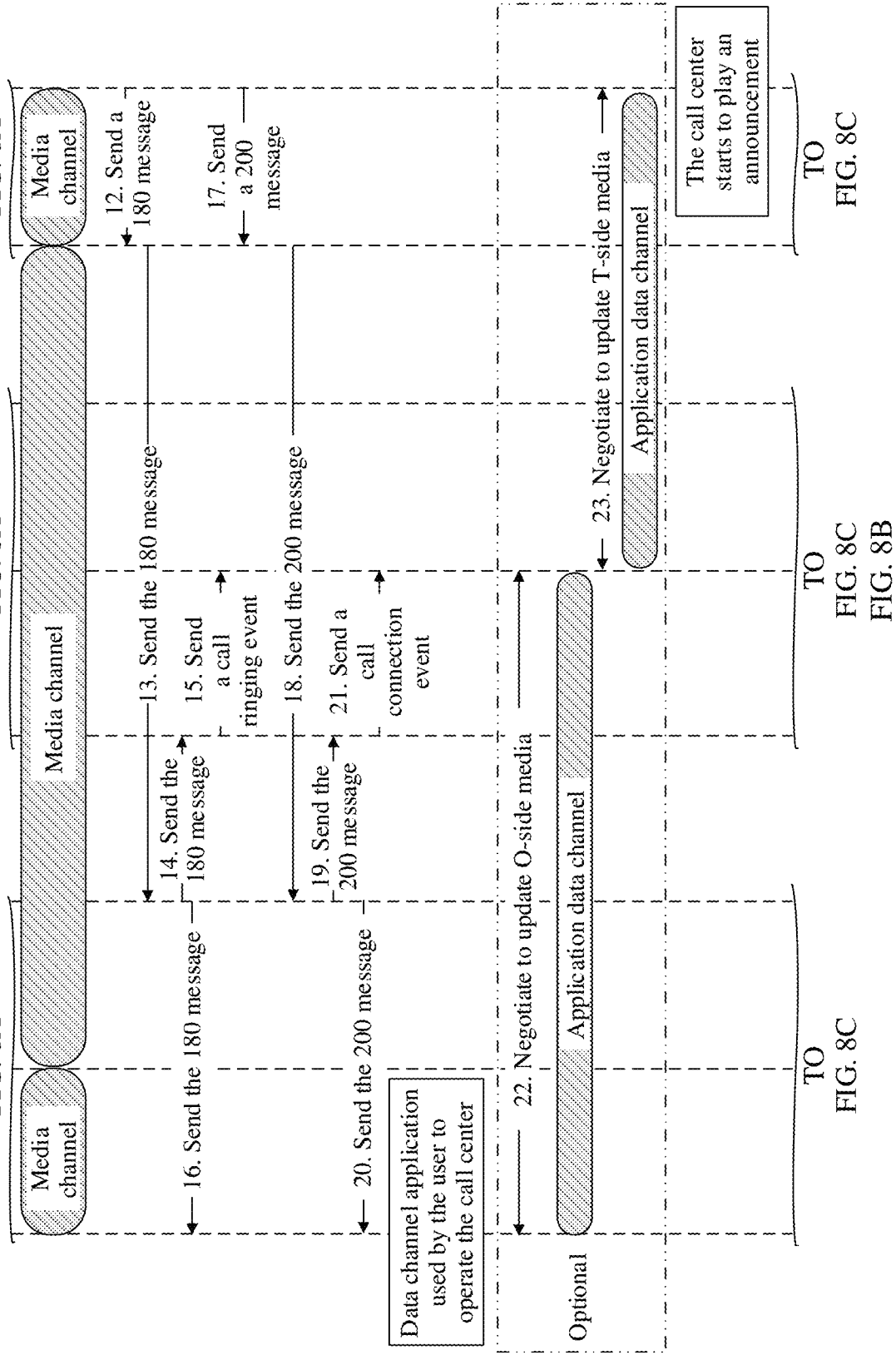

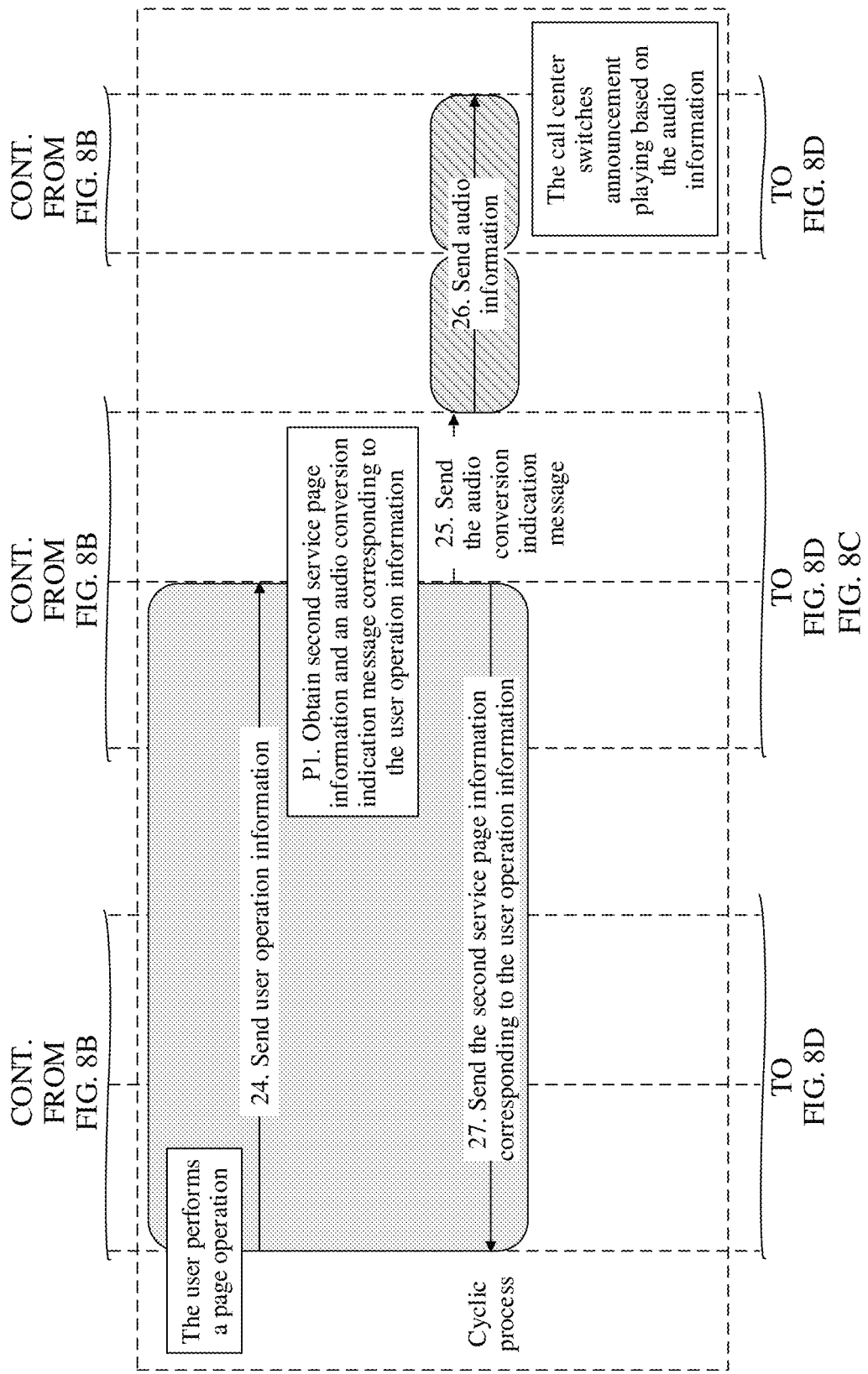

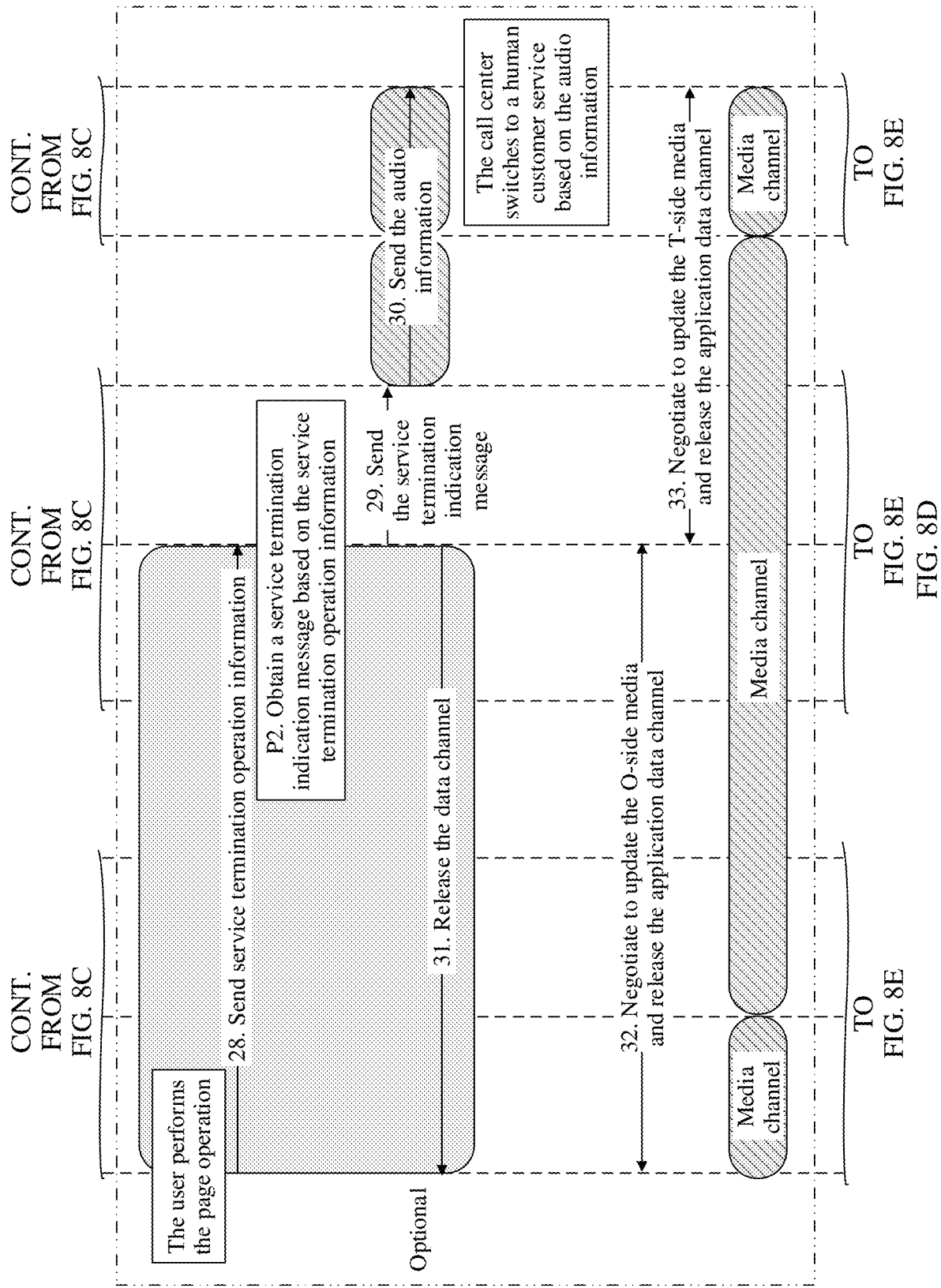

CALL PROCESSING METHOD, CALL PROCESSING APPARATUS, AND RELATED DEVICE

CROSS-REFERENCE TO RELATED APPLICATIONS

This application is a continuation of International Application No. PCT/CN2021/070534, filed on Jan. 6, 2021, The disclosure of the aforementioned application is hereby incorporated by reference in its entirety.

TECHNICAL FIELD

This application relates to the field of communication technologies, and in particular, to a call processing method, a call processing apparatus, and a related device.

BACKGROUND

A telecommunication network call center based on an IP multimedia system (IP multimedia system, IMS) is widely used in industries such as telecommunication, banking, insurance, and consumption, and is generally referred to as an automatic agent, a customer center, or a customer service hotline. An interactive voice response (interactive voice response, IVR) is used as a voice platform of the customer service hotline, and may provide a multi-level voice menu. A call is answered by using a pre-recorded or synthesized voice, to provide a voice menu navigation function for an incoming call of a customer.

For a mobile user, a self-service procedure of dialing the customer service hotline is mainly based on IVR voice navigation, or based on communication with a person or fixed key-press interaction. During the foregoing self-service processes, the customer needs to listen carefully or even re-hear voice navigation to select a correct key option, which causes a call processing delay and reduces processing efficiency.

SUMMARY

Embodiments of this application provide a call processing method, a call processing apparatus, and a related device. The method can implement an interactive service during a call, and help improve efficiency of processing a call service by a call processing system.

According to a first aspect, an embodiment of this application provides a call processing method, and the method may be performed by an application server. The application server establishes a data channel between the application server and a terminal device when detecting that the terminal device initiates or receives a call service. The application server obtains first service page information corresponding to the call service. The application server sends the first service page information to the terminal device through the data channel when detecting that the call service is connected.

It can be learned that, the application server associates an original call service with an interactive data channel service, and sends the first service page information (that is, initial service page information) to the terminal device through the data channel after the call service is connected, so that the terminal device can implement an interactive service during a call. This helps improve efficiency of processing the call service by a call processing system.

In a possible design, the first service page information includes a user interface (UI) page (or referred to as a UI) element and a control file, or the first service page information includes resource locators (URL) of the UI page element and the control file.

It can be learned that the application server may directly send the UI page element and the control file to the terminal device, or may send the URLs of the UI page element and the control file to the terminal device, so that the terminal device can obtain the corresponding UI page element and control file from a content server based on the URL.

In a possible design, the application server receives a call start event from a telephony server, and determines, based on the call start event, that the terminal device initiates the call service; or the application server receives a data channel establishment request message from the terminal device, and determines, based on the data channel establishment request message, that the terminal device initiates the call service.

It can be learned that, that the application server detects that the terminal device initiates the call service may be determined based on the call start event reported by the telephony server, or may be determined based on the data channel establishment request message sent by the terminal device.

In a possible design, the application service device is configured to receive a call request from a telephony server, and determine, based on the call request, that the terminal device initiates or receives a call service; or the application service device is configured to receive a data call request message from the terminal device, and determine, based on the call request message, that the terminal device initiates or receives a call service.

In a possible design, the call request message is an invite message.

In a possible design, that the application server detects that the terminal device initiates or receives a call service may include: The application server receives a called start event from a telephony server, and determines, based on the called start event, that the terminal device receives the call service; or the application server receives a data channel establishment request message from the terminal device, and determines, based on the data channel establishment request message, that the terminal device initiates or receives the call service.

It can be learned that when the terminal device is a called-side terminal device, the application server may determine, based on the called start event or the data channel establishment request message, that the terminal device receives the call service, to establish the data channel between the application server and the terminal device.

In a possible design, that the application server detects that the terminal device receives a call service may include: The application server receives a call response message from a telephony server or the terminal device, and determines, based on the call response message, that the terminal device receives the call service.

In a possible design, the call response message is a 200 ok message.

In a possible design, the application server receives a call connection event from a telephony server, and determines, based on the call connection event, that the call service of the terminal device is connected. Alternatively, the application server receives a call notification message from the terminal device, and determines, based on the call notification message, that the call service of the terminal device is connected.

It can be learned that, that the application server detects that the call service is connected may be determined based on the call connection event reported by the telephony server, or may be determined based on the call notification message reported by the terminal device.

In a possible design, the telephony server may be a telephony application server.

In a possible design, the application server obtains the corresponding first service page information based on one of the call start event, the call notification message, or the call connection event.

It can be learned that the application server may obtain the first service page information based on the foregoing event or message, to send the first service page information to the terminal device. The first service page information may be initial service page information.

In a possible design, the call notification message may be a 200 ok message.

In a possible design, the application server obtains, based on a called number included in the call start event, the first service page information corresponding to the called number.

It can be learned that the application server may specifically obtain the called number based on the call start event, to determine to deliver the first service page information corresponding to the called number to the terminal device.

In a possible design, the application server receives user operation information from the terminal device through the data channel, obtains corresponding second service page information based on the user operation information, and sends the second service page information to the terminal device.

It can be learned that, when the terminal device interacts with a UI page, corresponding user operation information may be sent to the application server through the data channel, so that the application server may determine, based on the user operation information, to send the second service page information to the terminal device again. Therefore, the terminal device updates a UI page on an audio/video call screen.

In a possible design, the application server receives the user operation information from the terminal device through the data channel, generates audio information based on the user operation information, and sends the audio information to a call center. The audio information may be a dual-tone multi-frequency DTMF signal.

It can be learned that the application server may further convert the user operation information into the DTMF signal, and send the DTMF signal to the call center, so that the call center updates a media stream of a call between the call center and the terminal device, and implements synchronization between the interactive service and the call service. In addition, the DTMF signal is an in-band signal, and the call center may directly process the DTMF signal, thereby simplifying a processing procedure.

In a possible design, the application server establishes a media channel between the application server and the call center, and sends the audio information to the call center through the media channel. Optionally, the application server serially connects the terminal, the application server and the call center to form a media channel between the terminal device and the call center, so as to establish the media channel between the application server and the call center.

In a possible design, the application server sends page indication information to the terminal device through the data channel, where the page indication information indicates the terminal device to display a UI page corresponding to the first service page information or to cache the corresponding UI page.

It can be learned that, after receiving the first service page information, the terminal device may determine, based on the page indication information, whether to directly display the UI page or first cache the UI page, so that the terminal device can implement the interactive service during the call more flexibly.

In a possible design, the application server receives service termination operation information from the terminal device through the data channel, and releases the data channel. The service termination operation information indicates to terminate the interactive service during the call.

It can be learned that when the terminal device needs to terminate the interactive service during the call, for example, a user selects a human customer service, the terminal device may send service termination operation information to the application server through the data channel, thereby releasing the data channel and avoiding a waste of resources.

In a possible design, the application server receives a call end event from a telephony server, and releases the data channel based on the call end event.

It can be learned that the application server may further release the data channel based on the call end event reported by the telephony server, to avoid a waste of data resources.

In a possible design, when detecting that the terminal device initiates the call service, the application server establishes a data channel between the application server and the terminal device if authentication of the terminal device succeeds. Authentication manners on the terminal device include one or more of access authentication, third-party login authentication, user name and password login authentication, or authentication via a device management DM server.

It can be learned that, before establishing the data channel between the application server and the terminal device, the application server may check, on a corresponding server based on an authentication manner of UE, whether the terminal device is an authorized device, to prevent an unauthorized user from accessing the application server, thereby ensuring security of the call processing system.

According to a second aspect, an embodiment of this application provides another call processing method, and the method may be performed by a terminal device. The terminal device establishes a data channel between the terminal device and an application server when initiating or receiving a call service. The terminal device receives, through the data channel, first service page information corresponding to the call service. The terminal device displays a corresponding UI page on a call screen based on the first service page information when the call service is connected.

It can be learned that, by establishing the data channel (for example, an IP multimedia subsystem IMS data channel) between the terminal device and the application server, the terminal device may receive interactive service data (for example, the first service page information) during a call, so that the terminal device can implement an interactive service during the call.

In a possible design, the first service page information includes a UI page element and a control file, or the first service page information includes resource locators (URL) of the UI page element and the control file.

In a possible design, the terminal device establishes a media channel between the terminal device and a call center, and receives a media stream of a call through the media channel.

It can be learned that, when initiating or receiving the call service, the terminal device first establishes the media channel between the terminal device and the call center, so that the media stream during the call may be received through the media channel, thereby implementing a call between the terminal device and the call center.

In a possible design, the terminal device establishes a media channel between the terminal device and a call center by using a border gateway controller, and receive a media stream of a call through the media channel. In this case, the media channel between the terminal device and the call center is divided into two segments, that is, the terminal device and the border gateway controller, and the border gateway controller and the call center. The media stream is forwarded by the border gateway controller.

In a possible design, the terminal device receives a 183 message from a call control server, and sends a call start event to the application server.

It can be learned that, by receiving the 183 message, the terminal device may confirm that the media channel between the terminal device and the call center has been established. Further, the terminal device may send the call start event to the application server through the data channel.

In a possible design, the terminal device receives a 200 message from a call control server, and sends a call notification message to the application server.

It can be learned that, by receiving the 183 message, the terminal device may confirm that the application server has connected the application server to the media channel between the terminal device and the call center. Further, the terminal device may send the call notification message to the application server through the data channel, so that the application server can deliver the first service page information to the terminal device.

In a possible design, the terminal device obtains user operation information, and sends the user operation information to the application server through the data channel.

It can be learned that the terminal device may convert a related operation of a user on the UI page into user operation information, and send the user operation information to the application server, so that the application server obtains corresponding second service page information based on the user operation information, and sends the second service page information to the terminal device.

In a possible design, the terminal device further receives, through the data channel, the second service page information corresponding to the user operation information.

In a possible design, the terminal device receives page indication information from the application server through the data channel, where the page indication information indicates the terminal device to display a UI page corresponding to the first service page information or to cache the UI page.

In a possible design, the terminal device displays a corresponding UI page based on the first service page information in a manner of covering the call screen. Alternatively, the terminal device displays, in a floating window above the call screen, a UI page corresponding to the first service page information.

It can be learned that the terminal device can display the UI page of the interactive service more flexibly, so that the user can perform an interactive operation.

In a possible design, the terminal device sends service termination operation information to the application server through the data channel, where the service termination operation information indicates to terminate the interactive service during the call.

In a possible design, when initiating or receiving the call service, if authentication succeeds, the terminal device establishes a data channel between the terminal device and the application server. Authentication manners on the terminal device include one or more of access authentication, user number-based third-party login authentication, user name and password login authentication, or authentication via a device management DM server.

It can be learned that the terminal device may implement validity authentication by using a plurality of authentication manners. The user number-based third-party login authentication can avoid adding an account deployment server and a user name account management system to a call processing system, thereby simplifying an implementation procedure.

According to a third aspect, an embodiment of this application provides a call processing apparatus. The call processing apparatus may be a device or a chip or a circuit disposed in the device. The call processing apparatus includes units and/or modules configured to perform the call processing method provided in the first aspect and/or any possible design of the first aspect. Therefore, beneficial effects of the call processing method provided in the first aspect can also be achieved.

According to a fourth aspect, an embodiment of this application provides a call processing apparatus. The call processing apparatus may be a device or a chip or a circuit disposed in the device. The call processing apparatus includes units and/or modules configured to perform the call processing method provided in the second aspect and/or any possible design of the second aspect. Therefore, beneficial effects of the call processing method provided in the second aspect can also be achieved.

According to a fifth aspect, an embodiment of this application provides an application server. The application server has a function of implementing the call processing method provided in the first aspect and/or any possible design of the first aspect. This function may be implemented by using hardware, or may be implemented by executing corresponding software by hardware. The hardware or the software includes one or more modules corresponding to the foregoing functions.

According to a sixth aspect, an embodiment of this application provides a terminal device. The terminal device has a function of implementing the call processing method provided in the second aspect and/or any possible design of the second aspect. This function may be implemented by using hardware, or may be implemented by executing corresponding software by hardware. The hardware or the software includes one or more modules corresponding to the foregoing functions.

According to a seventh aspect, an embodiment of this application provides a computer-readable storage medium. The readable storage medium includes a program or instructions. When the program or the instructions is/are run on a computer, the computer is enabled to perform the method in the first aspect or any possible implementation of the first aspect.

According to an eighth aspect, an embodiment of this application provides a computer-readable storage medium. The readable storage medium includes a program or instructions. When the program or the instructions is/are run on a computer, the computer is enabled to perform the method in the second aspect or any possible implementation of the second aspect.

According to a ninth aspect, an embodiment of this application provides a chip or a chip system. The chip or the chip system includes at least one processor and an interface, the interface and the at least one processor are interconnected through a line, and the at least one processor is configured to run a computer program or instructions, to perform the method described in the first aspect or any possible implementation of the first aspect.

According to a tenth aspect, an embodiment of this application provides a chip or a chip system. The chip or the chip system includes at least one processor and an interface, the interface and the at least one processor are interconnected through a line, and the at least one processor is configured to run a computer program or instructions, to perform the method described in the second aspect or any possible implementation of the second aspect.

The interface in the chip may be an input/output interface, a pin, a circuit, or the like.

The chip system in the foregoing aspect may be a system on chip (system on chip, SOC), a baseband chip, or the like. The baseband chip may include a processor, a channel encoder, a digital signal processor, a modem, an interface module, and the like.

In a possible implementation, the chip or the chip system described above in this application further includes at least one memory, and the at least one memory stores instructions. The memory may be a storage unit inside the chip, for example, a register or a cache, or may be a storage unit of the chip (for example, a read-only memory and a random access memory).

According to an eleventh aspect, an embodiment of this application provides a computer program or a computer program product, including code or instructions. When the code or the instructions is/are run on a computer, the computer is enabled to perform the method in the first aspect or any possible implementation of the first aspect.

According to a twelfth aspect, an embodiment of this application provides a computer program or a computer program product, including code or instructions. When the code or the instructions is/are run on a computer, the computer is enabled to perform the method in the second aspect or any possible implementation of the second aspect.

BRIEF DESCRIPTION OF DRAWINGS

To describe technical solutions of embodiments of this application more clearly, the following briefly describes the accompanying drawings for describing embodiments.

FIG. 7A, FIG. 7B, FIG. 7C, FIG. 7D, FIG. 7E, and FIG. 7F are a schematic diagram of an interactive service processing procedure during a call according to an embodiment of this application;

FIG. 8A, FIG. 8B, FIG. 8C, FIG. 8D, and FIG. 8E are a schematic diagram of another interactive service processing procedure during a call according to an embodiment of this application;

DESCRIPTION OF EMBODIMENTS

Figure 1A:
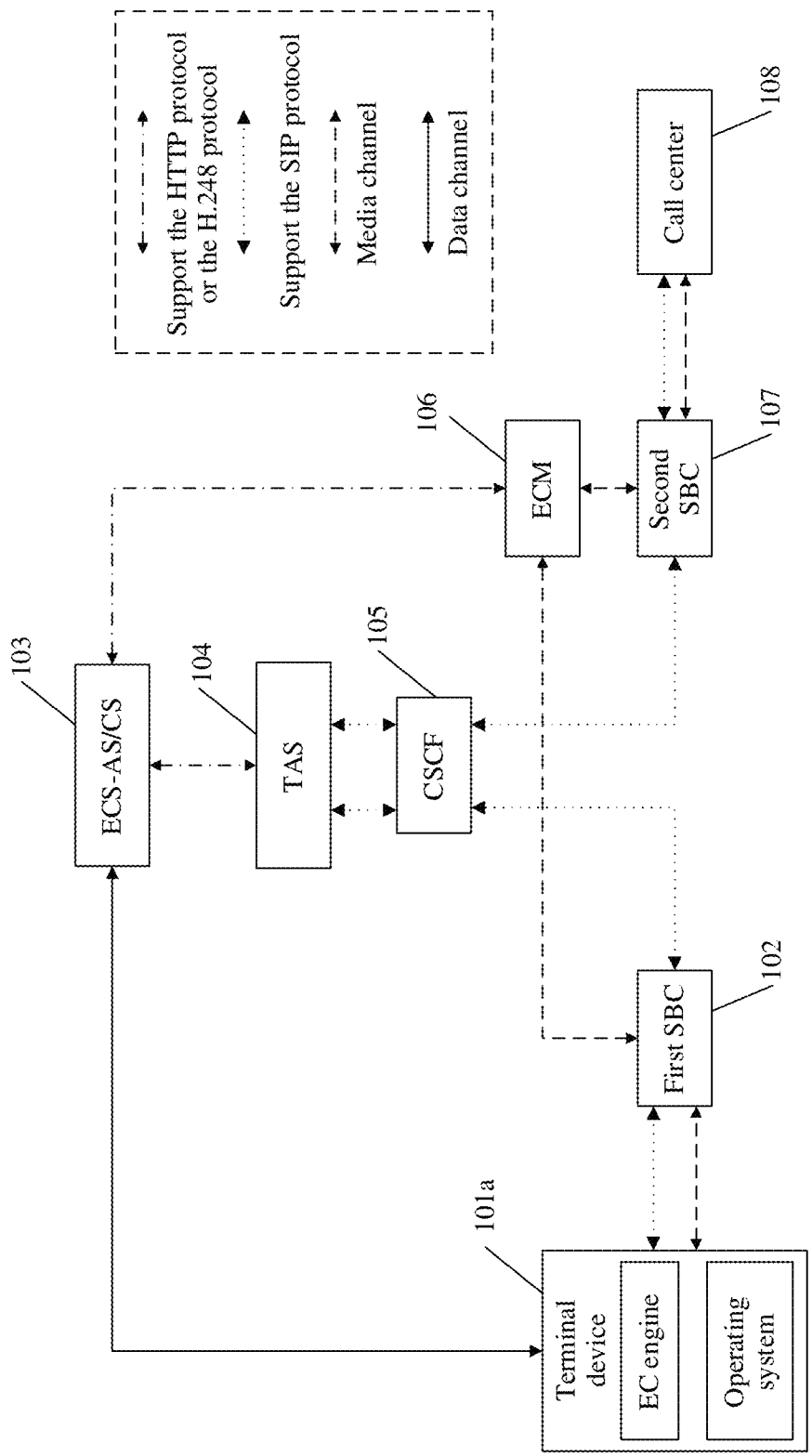
FIG. 1a is a schematic diagram of a structure of a call processing system according to an embodiment of this application.

In embodiments of this application, words "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The terms "second" and "first" in embodiments of this application are merely intended for a purpose of description, and shall not be understood as an indication or implication of relative importance or implicit indication of a quantity of indicated technical features. Therefore, a feature limited by "second" or "first" may explicitly or implicitly include one or more features. In the descriptions of this application, unless otherwise specified, "a plurality of" means two or more than two.

In this application, the term "at least one" means one or more, and in this application, the term "a plurality of" means two or more. For example, a plurality of first packets mean two or more first packets.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be understood that determining B based on A does not mean that B is determined based on only A, and B may alternatively be determined based on A and/or other information.

It should be further understood that the term "include" (or referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

The following describes the technical solutions in embodiments of this application with reference to the accompanying drawings in embodiments of this application.

A telecommunication network call center based on an IP multimedia subsystem (IP multimedia subsystem, IMS) is widely used in industries such as telecommunications, banking, insurance, and consumption, and is generally referred to as an automatic agent, a customer center, or a customer service hotline.

In one aspect, an interactive voice response (interactive voice response, IVR) is used as a voice platform of the customer service hotline, and may provide a multi-level voice menu. A call is answered by using a pre-recorded or synthesized voice, to provide a voice menu navigation function for a customer when the customer makes an incoming call. However, when using an IVR voice navigation service, a mobile user needs to listen carefully or even re-hear voice navigation to select a correct key option, which causes a call processing delay and reduces processing efficiency of the customer service hotline.

In another aspect, a voice customer service is introduced into the call center/customer service hotline. The voice customer service performs speech recognition based on an automatic speech recognition (automatic speech recognition, ASR) technology, that is, by using artificial intelligence (artificial intelligence, AI), to perform service interaction based on a speech recognition result. However, due to influences of regional dialects, accent differences, speaking habits, and unique terms of each industry, accuracy of speech recognition of the voice customer service is low, thereby reducing processing accuracy and processing efficiency of the voice customer service.

In still another aspect, the mobile user may further implement an IMS session service procedure based on 3GPP TS24.229 by using a terminal device having an interactive service function, and support an interaction procedure in an audio/video/fax/text manner through session initiation protocol offer answer (session initiation protocol offer answer, SIP OA) negotiation, and the terminal device also supports dual-tone multi-frequency (dual-tone multi-frequency, DTMF) announcement playing and digit collection. However, interactive operations during the call of the user on the terminal device can only be implemented by terminal manufacturers according to standards and specifications. If a new feature/function is added, a standard or specification needs to be formulated first, and the terminal manufacturer develops and performs network access authentication. As a result, an implementation period is long and the implementation depends on a plurality of terminal manufacturers.

To resolve the foregoing problem, an embodiment of this application provides a call processing method. The method is performed by a related device on a network side, so that an interactive service during a call can be implemented, thereby improving efficiency of processing the interactive service (for example, a customer service hotline service) during the call by a call processing system. It may be understood that, the interactive service during the call in this embodiment of this application may include an IMS session service procedure in 3GPP TS24.229, and an interactive service that supports interaction in an audio/video/fax/text manner in the IMS through SIP OA negotiation.

The call processing method provided in this embodiment of this application may be applied to a call processing system. The call processing system includes an application service device, an application media device, a content server (content server, CS), a telephony application server (telephony application server, TAS), a call control server, a session border control device (session border controller, SBC), a call center (call center), and a terminal device.

The application service device may be an enriched calling application server (enriched calling application server, ECS-AS), the application media device may be an enriched calling media (enriched calling media, ECM) device, and the call control server may be a call session control function (call session control function, CSCF) device.

The ECS-AS is a logical device newly added to the call processing system to provide the interactive service during the call. A manner of newly adding may be that the ECS-AS is an independent logical device, or may be integrated with a multimedia telephony server (IMS multimedia telephony application server, MINITEL AS) (that is, functions of the ECS-AS are integrated into the MMTEL AS). This is not limited in this embodiment. For different terminal devices, interaction manners between the ECS-AS and the terminal device are different. For example, when the ECS-AS interacts with a plug-in terminal, the ECS-AS directly establishes a data channel (data channel, DC) with the plug-in terminal to transmit interactive service content.

The ECS-AS can also control the ECM to provide DTMF announcement playing. For another example, when the ECS-AS interacts with a native terminal, the ECS-AS controls the ECM to establish a data channel between the ECM and the native terminal to transmit interactive service content.

The ECM is configured to establish a data channel between the ECM and the terminal device or provide DTMF announcement playing under control of the ECS-AS. The ECS-AS and the ECM may be deployed on a same physical device, or may be separately deployed on different physical devices. This is not limited in this embodiment. When the ECS-AS and the ECM are deployed on the different physical devices, a control protocol between the ECS-AS and the ECM may be a media gateway control protocol (H.248 protocol) or a hypertext transfer protocol (hypertext transfer protocol, HTTP).

The CS is configured to store data related to the interactive service. For example, the CS stores a user interface (user interface, UI) page element and a control file. The CS may be deployed on a same physical device with the ECS-AS, or may be independently deployed on a physical device. When the CS is independently deployed on the physical device, an address of the CS may be carried in a message, of a uniform resource locator (uniform resource locator, URL), sent by the ECS-AS to the terminal device, to notify the terminal device of the address of the CS. Alternatively, an address of the CS may also be carried in a message sent by a device management (device management, DM) server to the terminal device. This is not limited in this embodiment.

The TAS is configured to provide a voice service and a multimedia service for the terminal device, and supports a plurality of mainstream telecommunication network protocols, for example, supporting a SIP protocol and an intelligent network application protocol (intelligent network application protocol, INAP). In this embodiment of this application, the ECS-AS may subscribe to a call event from the TAS. In this case, after receiving INVITE call signaling, the TAS may report a call start event to the ECS-AS.

The CSCF is a call control center of an IMS core, and may implement functions such as user access, authentication, session routing, and service triggering on an IP transmission platform. The CSCF may include a serving CSCF (serving CSCF, S-CSCF), an interrogating CSCF (interrogating CSCF, I-CSCF), and the like.

The SBC may be deployed between an access network and a core network to provide border control functions between the access network and the IMS core network and between IMS core networks, and may provide functions such as access control, quality of service (quality of service) control, and firewall traversal. The call processing system in this embodiment of this application includes a calling SBC and a called SBC (also referred to as a called multimedia resource function (multimedia resource function, MRF)). The calling SBC serves a calling terminal device, and the called SBC serves a called terminal device. The SBC may include a proxy CSCF (proxy CSCF, P-CSCF) function, that is, the P-CSCF may be deployed in the SBC.

Using functions such as the IVR, the call center can simultaneously process a large quantity of incoming and outgoing call services and service operations. In other words, the call center is a service organization composed of a group of service personnel in a centralized place, and usually uses a computer communication technology to handle consultation requirements from enterprises and customers.

The terminal device may alternatively be referred to as user equipment (user equipment, UE). The terminal device may be a mobile phone (mobile phone), a tablet computer (pad), a computer with a wireless transceiver function, a virtual reality (virtual reality, VR) terminal, an augmented reality (augmented reality, AR) terminal, a vehicle, a wireless terminal in industrial control (industrial control), a wireless terminal in self driving (self driving), a wireless terminal in a smart city (smart city), and the like.

In an example, FIG. 1a is a schematic diagram of a structure of a call processing system according to an embodiment of this application. The call processing system includes a terminal device 101a, a first SBC 102, an ECS-AS/CS 103, a TAS 104, a CSCF 105, an ECM 106, a second SBC 107, and a call center 108. In the call processing system shown in FIG. 1a, the terminal device 101a is a plug-in terminal, that is, the terminal device 101a integrates an enriched calling (Enriched Calling) engine (which may also be referred to as an EC engine). The enriched calling engine, as an independent application (application, APP), may be integrated by the terminal or may be delivered with the terminal as an internal system service. The plug-in terminal may be pulled up by using a call event of an operating system (operating system, OS) of the terminal, display a UI page on a call screen of the terminal device in a manner of a floating window or a manner of directly covering the call screen, and provide an interactive operation by using the enriched calling engine. The UI page described in this embodiment may also be referred to as a service page, a hypertext markup language 5.0 (hypertext markup language 5.0, HTML5) page, or a visual menu. The foregoing nouns actually represent the UI page bearing the interactive service described in this embodiment.

Figure 2A:
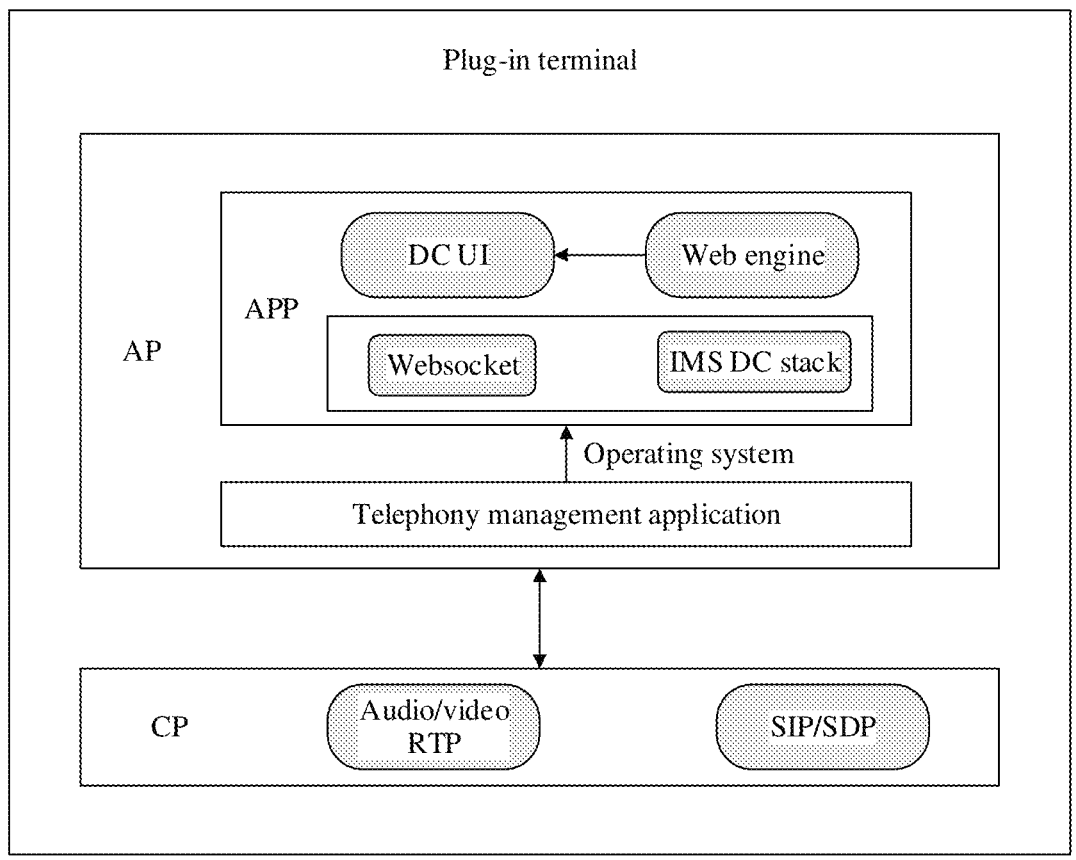
FIG. 2a is a schematic diagram of a structure of a plug-in terminal according to an embodiment of this application.
Figure 2B:
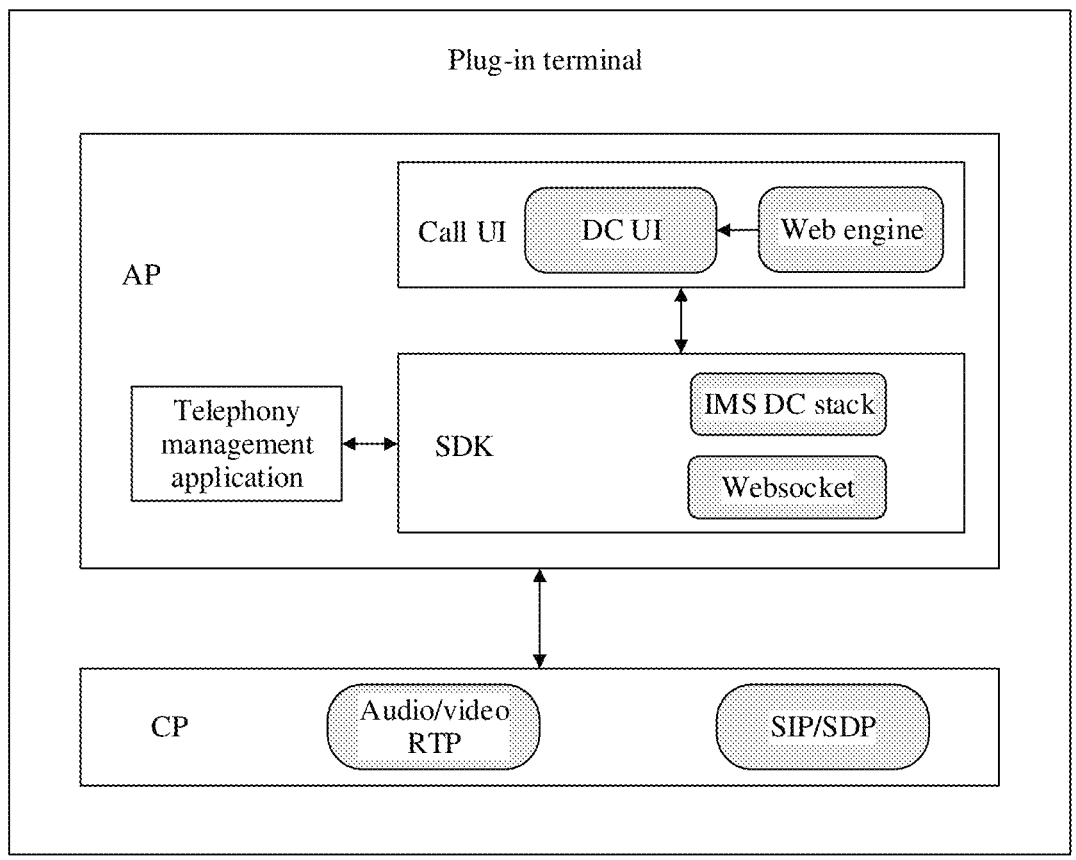
FIG. 2b is a schematic diagram of another structure of a plug-in terminal according to an embodiment of this application.

Refer to FIG. 2a and FIG. 2b. FIG. 2a is a schematic diagram of a structure of a plug-in terminal according to an embodiment of this application. The plug-in terminal shown in FIG. 2a may include modules such as an enriched calling (Enriched Calling) engine, an operating system, a telephony management application (telephony management application), and a coprocessor (coprocessor, CP). In the terminal shown in FIG. 2a, the telephony management application may invoke the enriched calling, that is, the telephony management application and the enriched calling engine APP may be started simultaneously. The telephony management application and the enriched calling engine APP cooperate to implement the call service provided in this embodiment. The enriched calling engine APP and the telephony management application run on an application processor (application processor, AP) of the terminal. The coprocessor CP is also referred to as a baseband chip plus coprocessor or a multimedia accelerator, and can enhance a multimedia function. The CP in FIG. 2a supports an SIP, a session description protocol (session description protocol, SDP), an audio/video real-time transport protocol (real-time transport protocol, RTP), and the like. By using the foregoing protocol, the terminal device may initiate, modify, or terminate an interactive multimedia session, thereby implementing an interactive service during a call. The enriched calling engine in FIG. 2a may be used as an independent APP to provide a corresponding function, and the enriched calling engine may include a DC UI and a web engine. The web engine is configured to parse a UI page, and the DC UI is configured to display the UI page parsed by the web engine.

FIG. 2b is a schematic diagram of another structure of a plug-in terminal according to an embodiment of this application. An enriched calling engine in FIG. 2b may directly serve as a system service inside the terminal (for example, implemented by using a native software development kit (software development kit, SDK)) to provide a corresponding function. FIG. 2b also includes a DC UI and a web engine, configured to implement functions similar to those of the DC UI and the web engine shown in FIG. 2a. Details are not described herein again.

In the plug-in terminal shown in each of FIG. 2a and FIG. 2b, a DC protocol stack of the SDK solution may include but is not limited to a stream control transmission protocol (stream control transmission protocol, SCTP), a datagram transport layer security (datagram transport layer security, DTLS) protocol, a user datagram protocol (user datagram protocol, UDP), and the like. The foregoing protocol may be negotiated by using a websocket in the AP. For example, port numbers, internet protocol (Internet protocol, IP) addresses, and the like of a transmit end and a receive end are negotiated by using the websocket, to establish an IP connection between the transmit end and the receive end. Optionally, the plug-in terminal device may further support another protocol stack (for example, a protocol stack such as HTTP). This is not limited in this embodiment.

As shown in FIG. 1a, a media channel and a data channel may be established between the terminal device 101a in FIG. 1a and the first SBC 102. In addition, signaling negotiation may be performed between the terminal device 101a and the first SBC 102 based on the SIP protocol through a signaling interface. A data channel is further established between the terminal device 101a and the ECS-AS/CS 103, and is used to transmit data related to the interactive service. The first SBC 102 serves the terminal device 101a.

A media channel or a data channel is also established between devices, or signaling negotiation is performed through a signaling interface. For example, signaling negotiation is performed between the ECS-AS/CS 103 and the TAS 104 based on the HTTP protocol or the H.248 protocol through the signaling interface. For another example, signaling negotiation is performed between the ECS-AS/CS 103 and the ECM 106 based on the HTTP protocol or the H.248 protocol through the signaling interface. For still another example, signaling negotiation is performed, based on the SIP protocol, between the TAS 104 and the CSCF 105 through the signaling interface, between the CSCF 105 and the first SBC 102 through the signaling interface, and between the CSCF 105 and the second SBC 107 through the signaling interface. For another example, a media channel is established between the ECM 106 and the first SBC 102, and a media channel is established between the ECM 106 and the second SBC 107. The media channel is used to transmit a multimedia service based on the RTP. For still another example, a media channel is established between the second SBC 107 and the call center 108, and is used to transmit multimedia audio/video. Signaling negotiation is further performed between the second SBC 107 and the call center 108 based on the SIP protocol through the signaling interface.

In the call processing system shown in FIG. 1a, the first SBC 102 may be considered as a calling SBC, and the second SBC 107 may be considered as a called SBC. The calling party and the called party are relative, and the second SBC 107 serves the call center. If the terminal device 101a and the call center 108 are located in a same IMS network, the first SBC 102 and the second SBC 107 may be a same device.

In addition, the ECS-AS/CS 103 and the ECM 106 may also be integrated into one device, for example, integrated into one application server. This is not limited in this embodiment.

Figure 1B:
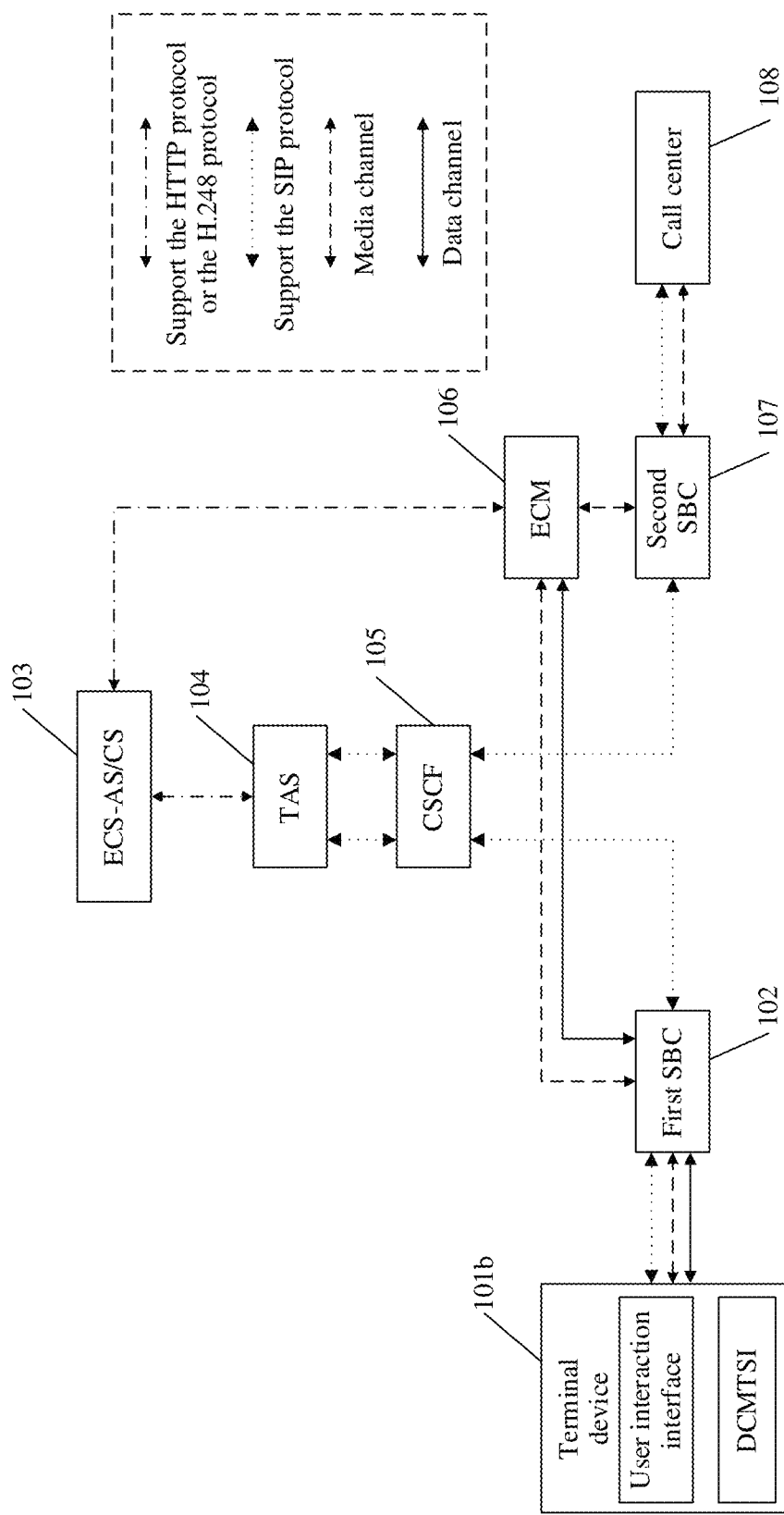
FIG. 1B is a schematic diagram of another structure of a call processing system according to an embodiment of this application.

In another example, FIG. 1B is a schematic diagram of another structure of a call processing system according to an embodiment of this application. FIG. 1B is similar to FIG. 1a, and includes a first SBC 102, an ECS-AS/CS 103, a TAS 104, a CSCF 105, an ECM 106, a second SBC 107, and a call center 108. However, different from FIG. 1a, the terminal device 101b in FIG. 1b is a DCMTSI (data channel multimedia telephony service for IMS) client (which may be referred to as a native terminal) that does not need an enriched calling engine and complies with a protocol standard of 3GPP TS26.114-g52 and a later release. The native terminal can establish a data channel between the native terminal and a device through SIP signaling negotiation. A call screen native service in the native terminal may directly provide an interactive operation by using the call screen.

A media channel and a data channel are also established between the terminal device 101b and the first SBC 102 in FIG. 1B, and signaling negotiation is performed based on the SIP protocol through the signaling interface, as shown in FIG. 1B. Different from the connection relationship in FIG. 1a, there is no data channel between the terminal device 101b and the ECS-AS/CS 103 in FIG. 1B, and a data channel is established between the terminal device 101b and the ECM 106, and is used to implement a function of the data channel between the terminal device 101a and the ECS-AS/CS 103 in FIG. 1a. The ECS-AS/CS 103 and the ECM 106 in FIG. 1B may also be integrated into one device, for example, integrated into one application server. When the ECS-AS/CS 103 and the ECM 106 are integrated, the data channel between the terminal device 101b and the ECM 106 may be considered as a data channel between the terminal device 101b and the application server.

In FIG. 1B, a media channel or a data channel is also established between devices, and signaling negotiation is performed through a signaling interface. For connection relationships between other devices, refer to descriptions in FIG. 1a. Details are not described herein again.

Figure 3:
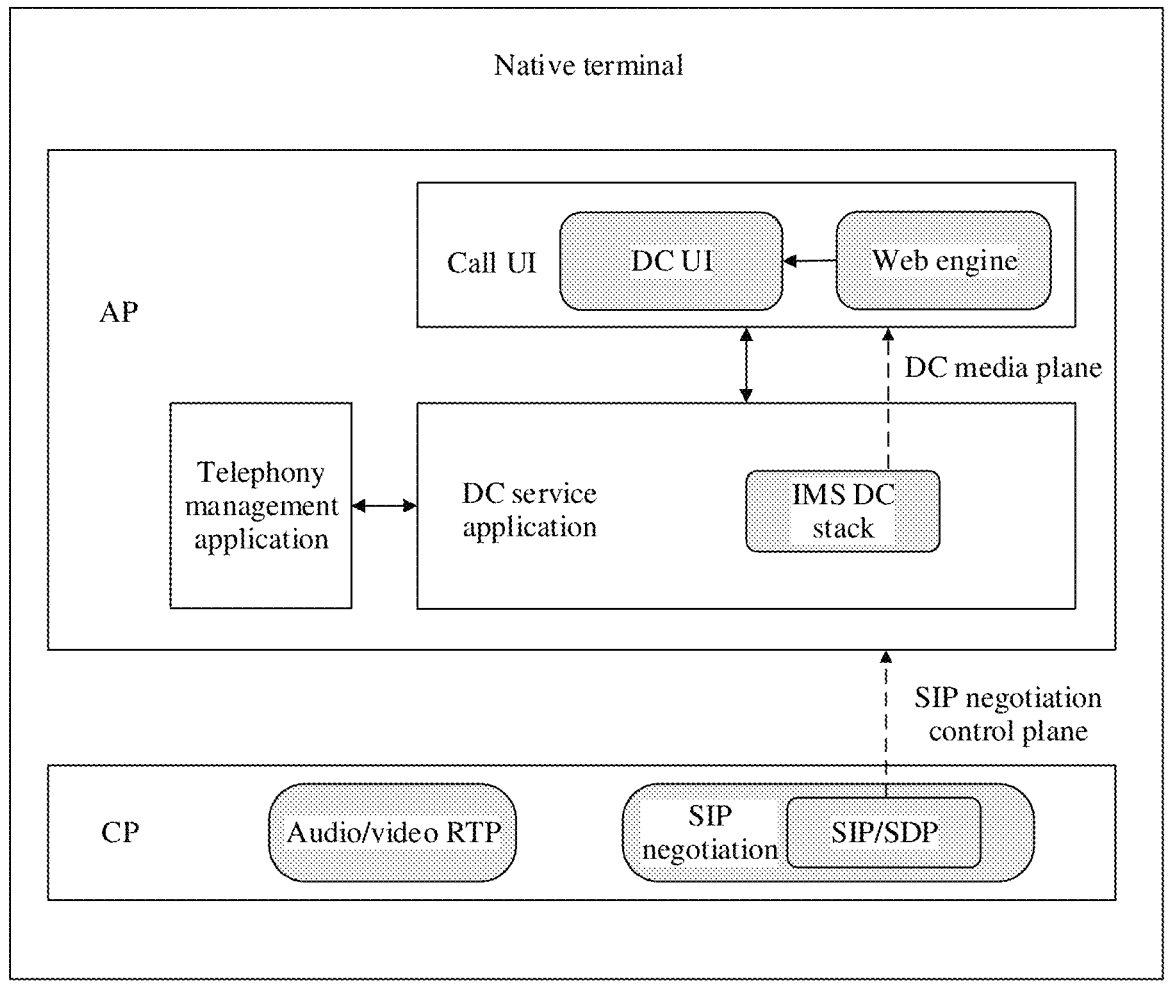
FIG. 3 is a schematic diagram of a structure of a native terminal according to an embodiment of this application.

FIG. 3 is a schematic diagram of a structure of a native terminal according to an embodiment of this application. Different from the plug-in terminal, the native terminal is a DCMTSI (data channel multimedia telephony service for IMS) client that does not need an enriched calling engine and complies with a protocol standard of 3GPP TS26.114-g52 and a later release. The native terminal includes an application processor AP and a coprocessor CP. The application processor may run a telephony management application, a call UI application, and a DC service. When the telephony management application makes or connects a call, a data channel is established through SIP signaling negotiation of the CP. A native terminal DC protocol stack includes but is not limited to protocols such as an SCTP/DTLS/UDP, and can be negotiated by using the SIP in the CP (that is, no built-in websocket is required).

In an example, an enriched call application server ECS-AS, an enriched call media device ECM, a content server CS, and a telephony application server TAS may be integrated into one device. The device may be referred to as one application server, and is configured to implement a function of the foregoing ECS-AS/ECM/CS/TAS. Optionally, the enriched call application server ECS-AS, the enriched call media device ECM, and the content server CS may be integrated into one application server, the telephony application server TAS is a separate device, and signaling interaction may be performed between the application server and the TAS based on the HTTP protocol or the H.248 protocol.

The following describes in detail embodiments of this application.

Figure 4:
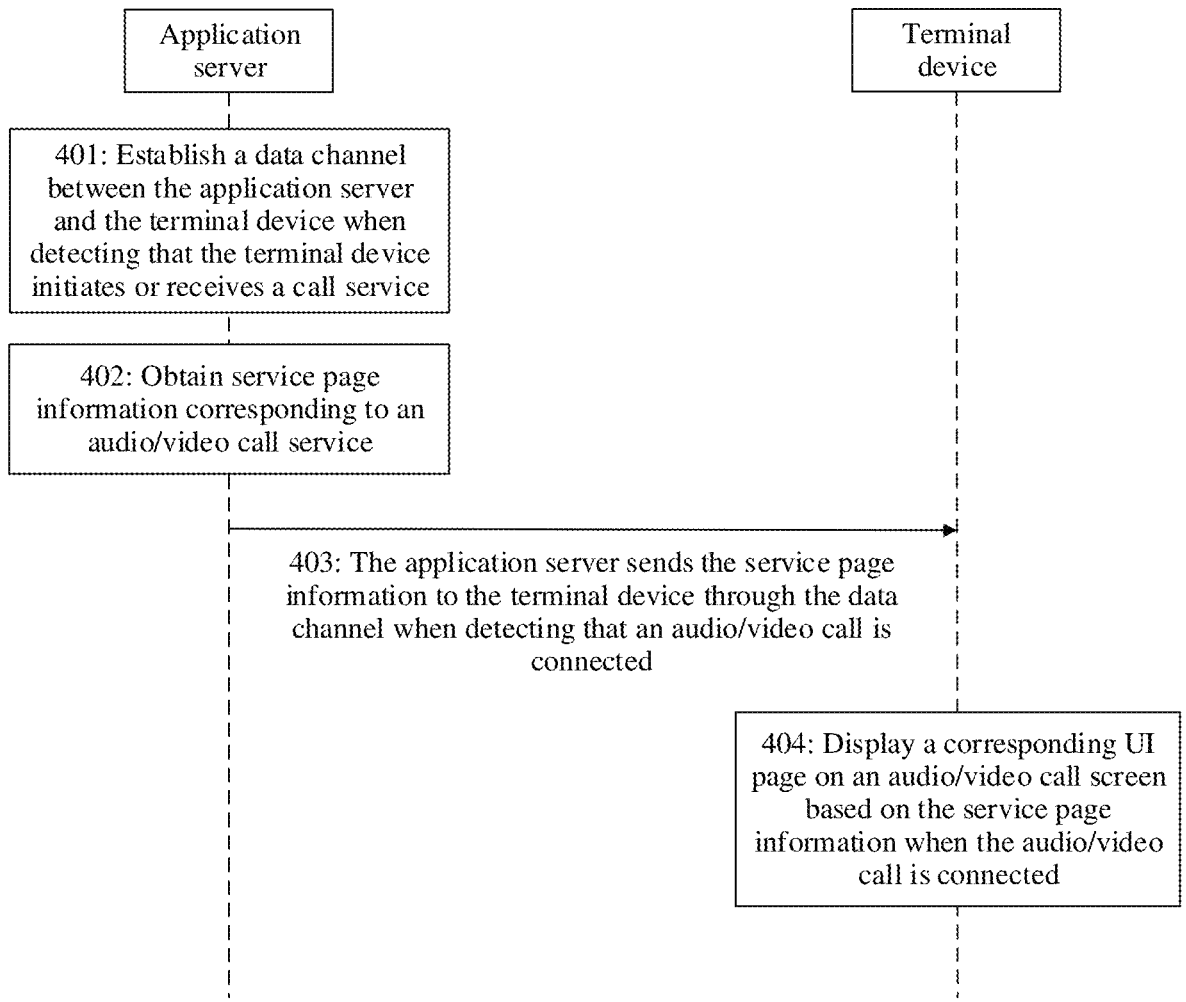
FIG. 4 is a schematic flowchart of a call processing method according to an embodiment of this application.

FIG. 4 is a schematic flowchart of a call processing method according to an embodiment of this application. An application server in FIG. 4 includes an ECS-AS/CS/ECM, that is, the ECS-AS, the CS, and the ECM are integrated into one application server. In addition, the application server in FIG. 4 may further include a TAS. The method may be implemented by interaction between the application server and a terminal device, and includes the following steps.

401: The application server establishes a data channel between the application server and the terminal device when detecting that the terminal device initiates or receives a call service.

402: The application server obtains first service page information corresponding to the call service.

403: The application server sends the first service page information to the terminal device through the data channel when detecting that the call service is connected. Correspondingly, the terminal device receives the first service page information through the data channel.

404: The terminal device displays a corresponding UI page on a call screen based on the first service page information when the call service is connected.

In this embodiment, if the application server can subscribe to a call event from a telephony server TAS, when the terminal device initiates the call service, the application server may detect that the terminal device initiates the call service. That the application server detects that the terminal device initiates the call service includes two cases.

Case 1: The application server receives a call start event from the telephony server, and determines, based on the call start event, that the terminal device initiates the call service.

For example, the application server receives the call start event from the TAS. A specific triggering manner is as follows: A user makes a call, the terminal device sends INVITE call signaling to a CSCF of a calling IMS core, the CSCF forwards the INVITE call signaling to the TAS, and the TAS reports the call start event to the application server. Correspondingly, the application server receives the call start event, and determines, based on the call start event, that the terminal device is initiating the call service.

Case 2: The application server receives a data channel establishment request message from the terminal device, and determines, based on the data channel establishment request message, that the terminal device initiates the call service.

For example, when a user makes a call, an operating system in the terminal device may notify an enriched calling engine that the call starts, and the enriched calling engine may send the data channel establishment request message to the ECS-AS. Correspondingly, the ECS-AS receives the data channel establishment request message, and determines, based on the data channel establishment request message, that the terminal device is initiating the call service.

Optionally, before establishing the data channel between the application server and the terminal device when detecting that the terminal device initiates the call service, the application server may also perform authentication on the terminal device. The authentication manner described in this embodiment may include two-way authentication between a calling side and a called side, or unidirectional authentication from the terminal device to the application server. Specifically, authentication manners on the terminal device include one or more of access authentication, third-party login authentication, user name and password login authentication, or authentication via a device management DM server.

1. Access authentication is applicable to the terminal device implemented in the SDK mode shown in FIG. 2b or the native terminal shown in FIG. 3. For example, a system service of the native terminal may implement authentication in an IMS generic bootstrapping architecture (generic bootstrapping architecture, GBA) manner.

2. Third-party login authentication is applicable to the terminal device implemented in the APP integration manner shown in FIG. 2a. For example, an APP in the terminal device is authenticated by a gateway of an operator, and a user authorizes a local phone number in one-tap mode to complete unidirectional authentication from the terminal device to the application server. A third-party login authentication manner based on the local phone number can avoid adding an account deployment server and a user name account management system, thereby simplifying an implementation procedure of the solution.

3. User name and password login authentication is applicable to the terminal device implemented in the APP integration manner shown in FIG. 2a. For example, a user enters a user name and a password to complete unidirectional authentication from the terminal device to the application server.

4. Deployment of a device management server is applicable to the terminal devices in the system service/APP integration manner shown in FIG. 2a, FIG. 2b, and FIG. 3. In this authentication manner, a message similar to a fifth generation (5th generation, 5G) message is used, and an authentication token is obtained from the DM server by using the 5G message, to implement unidirectional authentication from the terminal device to the application server.

The application server may establish the data channel between the application server and the terminal device when detecting that the terminal device initiates the call service. The data channel may be considered as an IMS data channel. For the application server, the data channel is used to transmit related data of an interactive service during a call, or the data channel may be further used to transmit indication information between the application server and the terminal device. For example, the application server sends a UI page of the interactive service during the call to the terminal device through the data channel, so that the terminal device can display the UI page on a display screen for interaction and browsing by the user.

In an implementation, the terminal device may establish the data channel between the terminal device and the ECS-AS in the application server, and the ECS-AS receives signaling from the terminal device through the data channel, or sends related data of the interactive service during the call to the terminal device. In this case, the ECS-AS has both a function of a control plane device and a function of a media plane device. For example, the ECS-AS may receive a call start event from the terminal device through the data channel. The call start event may be considered as one piece of signaling, that is, the ECS-AS may process the control signaling. For another example, the ECS-AS may send first service page information to the terminal device through the data channel. The first service page information may be considered as a group of media data, that is, the ECS-AS may process the data.

In another implementation, the terminal device may establish the data channel between the terminal device and the ECM in the application server, and the ECM sends data related to the interactive service during the call to the terminal device through the data channel. In this case, the ECM has a function of a media plane device, and the ECS-AS has a function of a control plane device. For example, the terminal device sends the call start event to the ECM through the data channel, but the ECM cannot process the received call start event. The ECM may send the call start event to the ECS-AS, and the ECS-AS determines, based on the call start event, that the terminal device initiates the call service, and sends a data channel establishment indication message to the ECM, to indicate the ECM to establish the data channel between the ECM and the terminal device. The ECM establishes the data channel between the ECM and the terminal device based on the data channel establishment indication message. That is, the media plane and the control plane in the application server are separated.

When detecting that the terminal device initiates the call service, the application server may obtain the first service page information corresponding to the call service. The first service page information may be initial service page information corresponding to the call service. For example, assuming that the call service initiated by the terminal device is that a customer service hotline of an operator is dialed on the terminal device, the application server detects that the customer service hotline of the operator is dialed on the terminal device, and may obtain first service page information corresponding to the customer service hotline service of the operator.

The first service page information includes a UI page element and a control file. The UI page element refers to all page elements that constitute a UI page, and may include but is not limited to a text, a text box, a picture, a video, and the like on the UI page. For example, the UI page described in this embodiment may be a hypertext markup language 5.0 (hypertext markup language 5.0, HTML5) page, and elements that form the entire HTML5 page, such as a text box, a picture, and a video in the HTML5 page are all referred to as UI page elements. The control file refers to a JavaScript script (JS script for short) that can be used to edit the UI page. The JS script includes a rendering rule of the UI page, a display location of the UI page element, and an address or an identifier of a next-level UI page to which a directional UI page element points. For example, a UI page 1 includes a directional UI page element. After a user taps the UI page element, the terminal device may determine, based on a JS script, an address or an identifier of a next-level UI page to which the UI page element points, to display the next-level UI page on a display screen.

It can be learned that the terminal device combines the UI page element and the control file, that is, the terminal device may display the UI page on the display screen of the terminal device, and may provide an interactive operation for the user based on the control file. The first service page information in this embodiment may include UI page elements of a plurality of UI pages and control files of the UI pages.

Optionally, the first service page information may further include URLs of the UI page element and the control file. That is, the first service page information does not directly include the HTML5 page, but includes a URL of the HTML5 page. After receiving the URL of the HTML5 page, the terminal device may determine, based on the URL, a content server storing the HTML5 page and the JS script, and obtain the HTML5 page and the JS script from the corresponding content server through the data channel.

In an implementation, the application server may obtain corresponding first service page information based on the call start event. That is, when the application server receives the call start event from the telephony server, the application server may obtain the corresponding first service page information based on the call start event. For example, the call start event usually includes a calling number and a called number. In this case, the application server may obtain, based on the called number, the first service page information corresponding to the called number.

Optionally, after obtaining the first service page information, the application media device may send the first service page information to the terminal device through the data channel. Correspondingly, the terminal device receives the first service page information, and downloads an actual service page resource according to a page requirement. For example, the terminal device receives a URL of an initial page, and obtains an initial page and a JS script from a corresponding content server based on the URL of the initial page. After the call service is connected, the terminal device may display the initial page on an audio/video call screen. In this embodiment, the terminal device displays the HTML5 page on the audio/video call screen only when the application service device detects that the call service is connected. After the terminal device receives the first service page information, if an audio/video call between the terminal device and the call center is not confirmed to be connected temporarily at this time, the terminal device may first cache the first service page information, that is, do not display the HTML5 page.

In an example, that the application server detects that the call service is connected may include the following two cases.

Case 1: The application server receives a call connection event from a telephony server, and determines, based on the call connection event, that the call service of the terminal device is connected.

For example, the call center sends a 200 ok (200 for short) message to a called IMS core, to indicate that the call center starts to play an announcement. The called IMS core sends a 200 message to the calling IMS core, and the CSCF in the calling IMS core sends the 200 message to the TAS. After receiving the 200 message sent by the CSCF, the TAS determines that the call center starts to play the announcement, and the TAS may send the call connection event to the application server. Correspondingly, the application server receives the call connection event sent by the TAS, to determine that the call service between the terminal device and the call center is connected.

Case 2: The application server receives a call notification message from the terminal device, and determines, based on the call notification message, that the call service of the terminal device is connected.

For example, the call center sends a 200 message to a called IMS core, to indicate that the call center starts to play an announcement. The called IMS core sends the 200 message to the calling IMS core, the CSCF in the calling IMS core sends the 200 message to the TAS, and the TAS sends the 200 message to the terminal device. After receiving the 200 message sent by the TAS, the terminal device determines that the call center starts to play the announcement. The terminal device may send the call notification message to the application server. Correspondingly, the application server receives the call notification message sent by the terminal device, to determine that the call service between the terminal device and the call center is connected.

In an implementation, the application server may obtain the corresponding first service page information based on the call connection event or the call notification message. That is, when the application server receives the call connection event from the telephony server, the application server may obtain the corresponding first service page information based on the call connection event. Alternatively, when the application server receives the call notification message from the terminal device, the application server may obtain the corresponding first service page information based on the call notification message. For example, if the application server receives the call connection event and confirms that the call center starts to play a ring tone when the call center is initially connected, the application server may obtain an initial HTML5 page.

The application server sends the first service page information to the terminal device through the data channel when detecting that the call service is connected. Correspondingly, the terminal device receives the first service page information through the data channel, and downloads an actual service page. For example, if the first service page information includes a URL of the initial page, the terminal device may obtain the initial page and a control file from a corresponding content server based on the URL.

Optionally, after detecting that the call service is connected, the application server may further send page indication information to the terminal device, where the page indication information indicates the terminal device to display a UI page corresponding to the first service page information or cache the UI page. For example, if the terminal device receives and caches the first service page information in advance, and after the call service is connected, the application server delivers the page indication information to the terminal device, to indicate the terminal device to display the initial HTML5 page. Therefore, the terminal device may display the initial HTML5 page on the display screen.

In an example, the terminal device receives the first service page information from the application server through the data channel, and displays a corresponding UI page on the call screen based on the first service page information when the call service between the terminal device and the call center is connected. The terminal device may display the corresponding UI page on the call screen in the following two manners.

Manner 1: The terminal device displays, in a floating window above the call screen, the UI page corresponding to the first service page.

Figure 5:
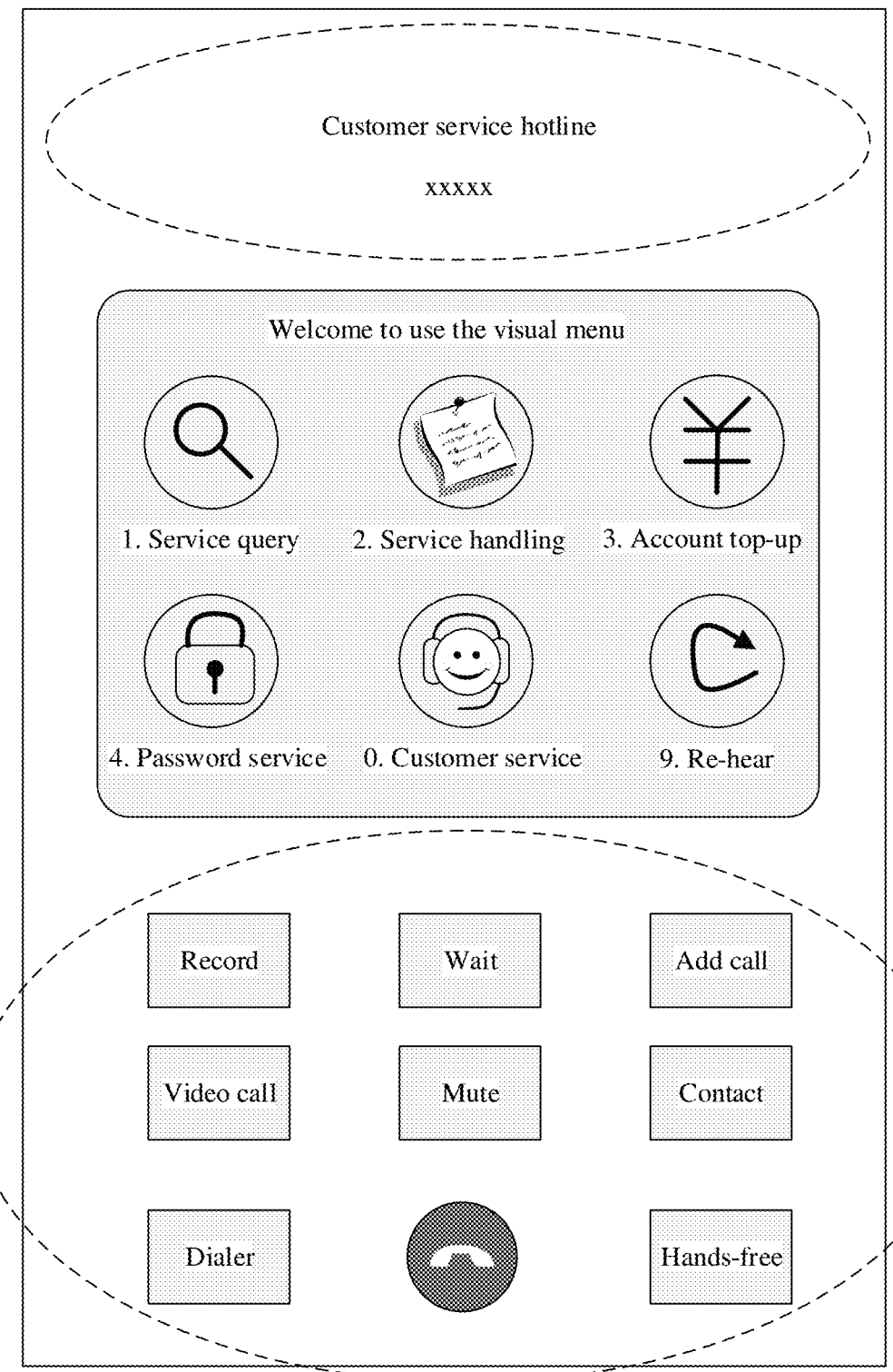
FIG. 5 is a schematic diagram of displaying, by a terminal device on a call screen, a UI page corresponding to first service page information according to an embodiment of this application.

FIG. 5 is a schematic diagram of displaying, by a terminal device on a call screen, a UI page corresponding to first service page information according to an embodiment of this application. When a user dials a customer service hotline "xxxxx" and the customer service hotline is connected, an existing call screen of the customer service hotline is still displayed at a bottom layer on a display screen of the terminal device, as shown by a dotted box in FIG. 5. The UI page (that is, a visual menu in FIG. 5) described in this embodiment is displayed on the top of the call screen in a manner of the floating window. In this display manner, the user may perform a related operation on the existing call screen, for example, tapping a recording icon to record. The user can also perform a related operation in the visual menu of the floating window, for example, tapping a service query icon to query a related service. It can be learned that, the terminal device displays the UI page corresponding to the first service page in Manner 1, edits a visual menu by using a JS script, and displays the UI page above the existing call screen by using a web engine without needing to modify or insert the existing call screen. An implementation is more convenient.

Manner 2: The terminal device directly covers the call screen by using the UI page corresponding to the first service page, so that the display screen of the terminal device displays the UI page.

Figure 6A:
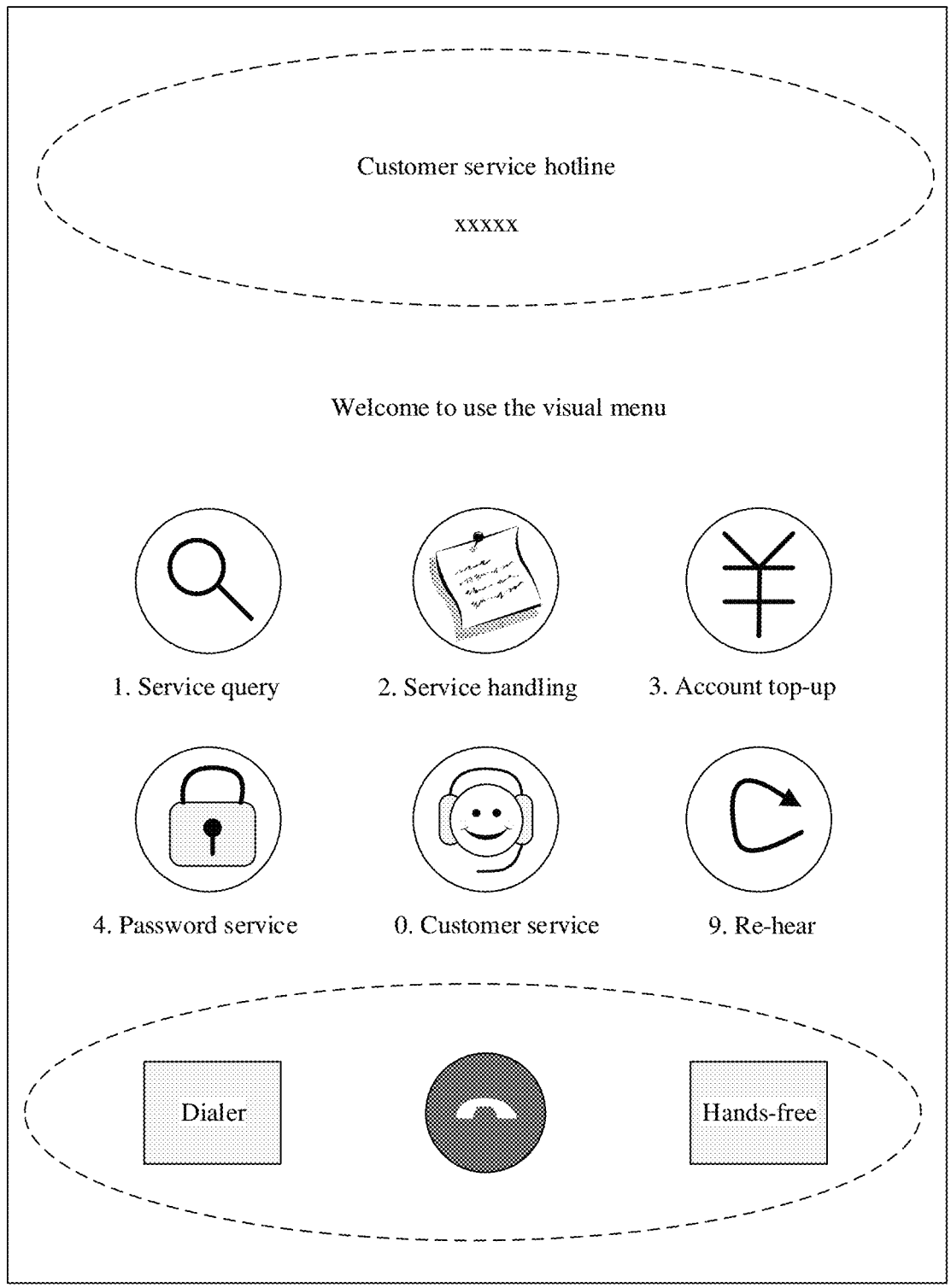
FIG. 6a is another schematic diagram of displaying, by a terminal device on a call screen, a UI page corresponding to first service page information according to an embodiment of this application.

FIG. 6a is another schematic diagram of displaying, by a terminal device on a call screen, a UI page corresponding to first service page information according to an embodiment of this application. When a user dials a customer service hotline "xxxxx" and the customer service hotline is connected, the display screen of the terminal device displays the UI page corresponding to the first service page. That is, a visual menu in FIG. 6a completely covers an existing call screen, and is used to display content related to an interactive service during a call.

Optionally, when displaying the UI page in Manner 2, the terminal device may display a related element on the existing call screen on the UI page based on a UI page element and a control file. For example, the visual menu shown in FIG. 6a further includes UI page elements such as a number display part and a dialer display part on the existing call screen shown in FIG. 5, as shown by a dotted line area in FIG. 6a. The UI page elements in the dotted line area in FIG. 6a are designed and converted by the application server based on the element in the existing call screen, to generate a corresponding UI page element and control file, so that the terminal device can display the UI page element on the call screen based on the first service page information, to implement a similar function.

In an example, the terminal device may obtain user operation information. The user operation information is information converted from a user operation entered by the user on the UI page of the terminal device, that is, the user operation information indicates the user operation performed by the user on the UI page of the terminal device. The user operation may include but is not limited to a tapping operation, a sliding operation, character string entering, or the like of the user on the UI page.

For example, the user may tap any option in the visual menu shown in FIG. 6a. If the user taps an icon corresponding to "1. Service query", a user operation in this case is tapping "1. Service query" icon. Corresponding user operation information is that the user taps "1. Service query" on the UI page.

After obtaining the user operation information, the terminal device may send the user operation information to the application server through the data channel. Correspondingly, the application server receives the user operation information from the terminal device, and parses the user operation information, to obtain second service page information corresponding to the user operation information. For example, the user operation information received by the application server is that the user taps "1. Service query" on the UI page. After parsing, the application server determines that second service page information corresponding to "1. Service query" needs to be obtained.

The application server stores a plurality of service logics, and each service logic indicates an association between the user operation information of the terminal device and service page information (including the first service page information and the second service page information). That is, the application server may push corresponding service page information to the terminal device based on the service logic. For example, when the user operation information is that the query icon is tapped on the UI page of the terminal device, the application server obtains, based on the service logic, a next-level UI page corresponding to the query icon, and sends second service page information including the next-level UI page corresponding to the query icon to the terminal device. For another example, when the terminal device is initially connected, the application server may also obtain an initial service page based on the service logic, and send first service page information including the initial service page to the terminal device.

After obtaining the second service page information corresponding to the user operation information, the application server sends the second service page information to the terminal device through the data channel. Correspondingly, the terminal device receives the second service page information, and displays, on the call screen, a UI page corresponding to the second service page information.

Figure 6B:
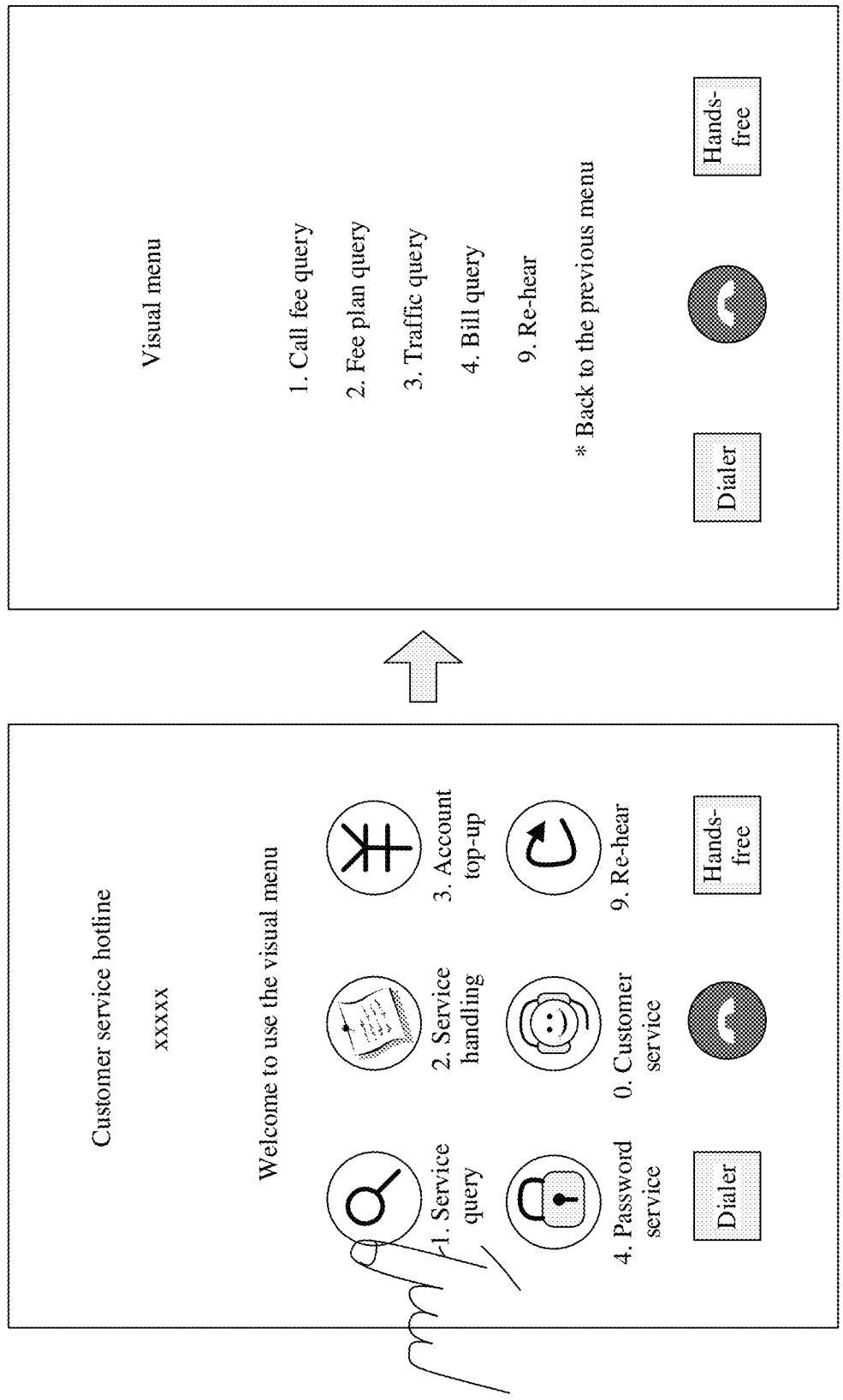
FIG. 6b is a schematic diagram of a UI page corresponding to user operation information according to an embodiment of this application.

For example, FIG. 6b is a schematic diagram of a UI page corresponding to user operation information according to an embodiment of this application. The user operation information is that the user taps "1. Service query" on a UI page shown on the left side of FIG. 6b, and a UI page corresponding to the user operation information is shown on the right side of FIG. 6b. The UI page includes specific query options, such as "1. Call fee query" and "2. Fee plan query", so that the user can further select to-be-queried specific content.

Optionally, the operation performed by the user on the UI page of the terminal device may be a cyclic process, that is, the user may perform operations on the UI page for a plurality of times. Correspondingly, the terminal device may obtain an operation performed by the user on the UI page each time, generate corresponding user operation information, and send a plurality of pieces of user operation information to the application server through the data channel. The plurality of pieces of user operation information may correspond to a plurality of pieces of second service page information, or may correspond to one piece of second service page information. When the plurality of pieces of user operation information correspond to one piece of second service page information, it indicates that one piece of second service page information includes UI page elements and control files that are respectively of a plurality of UI pages. In this case, the terminal device may obtain a UI page element and a control file of a specific UI page specifically corresponding to the user operation.

Figure 6C:
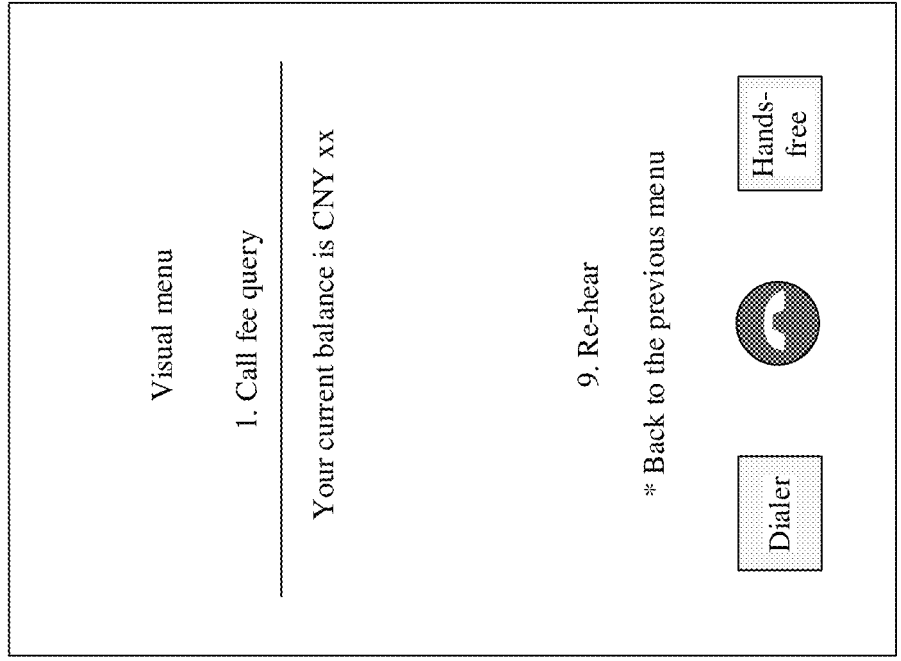
FIG. 6c is another schematic diagram of a UI page corresponding to user operation information according to an embodiment of this application.
Figure 6C:
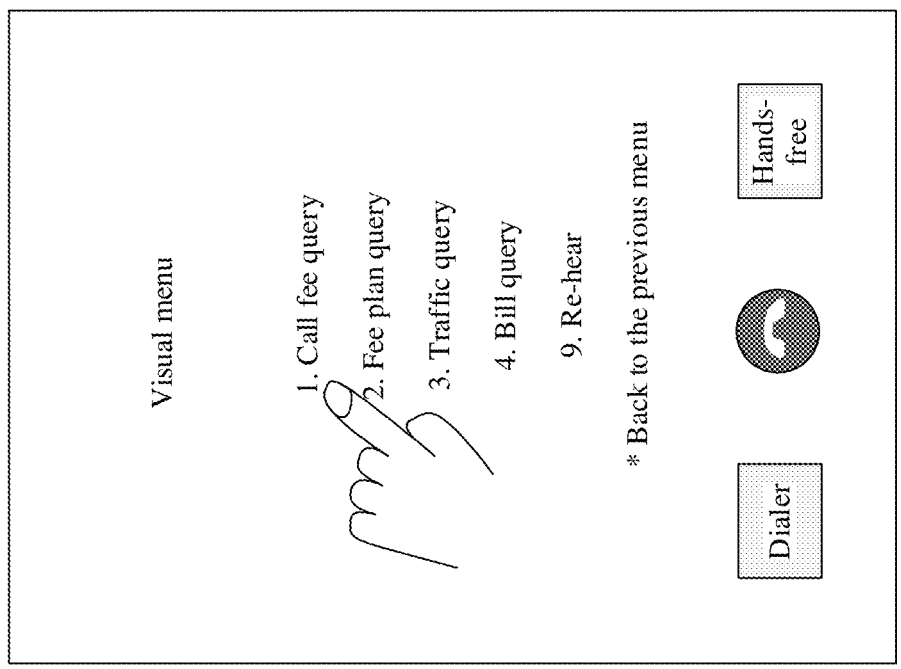

For example, FIG. 6c is another schematic diagram of a UI page corresponding to user operation information according to an embodiment of this application. The user operation information is that the user taps "1. Call fee query" on a UI page shown on the left side of FIG. 6c, and a UI page corresponding to the user operation information is shown in FIG. 6c. The UI page includes specific content of the call fee query, and is displayed on the UI page in a form of text, as shown on the right side of FIG. 6c. The UI pages shown in FIG. 6b and FIG. 6c may be included in one piece of second service page information. When the user operation information is that the user taps "1. Service query" on the UI page shown in FIG. 6a, the application server may integrate all UI pages related to "1. Service query" (the UI pages shown in FIG. 6b and FIG. 6c and a UI page corresponding to another service query option) into one piece of second service page information, and send the second service page information to the terminal device. The terminal device receives the second service page information, and determines to display some of the UI pages (for example, when the user taps "1. Service query", the UI page shown on the right side of FIG. 6b is displayed) to cache some of the UI pages (for example, when the user taps "1. Call fee query", the UI page shown on the right side of FIG. 6c is cached).

Figure 6D:
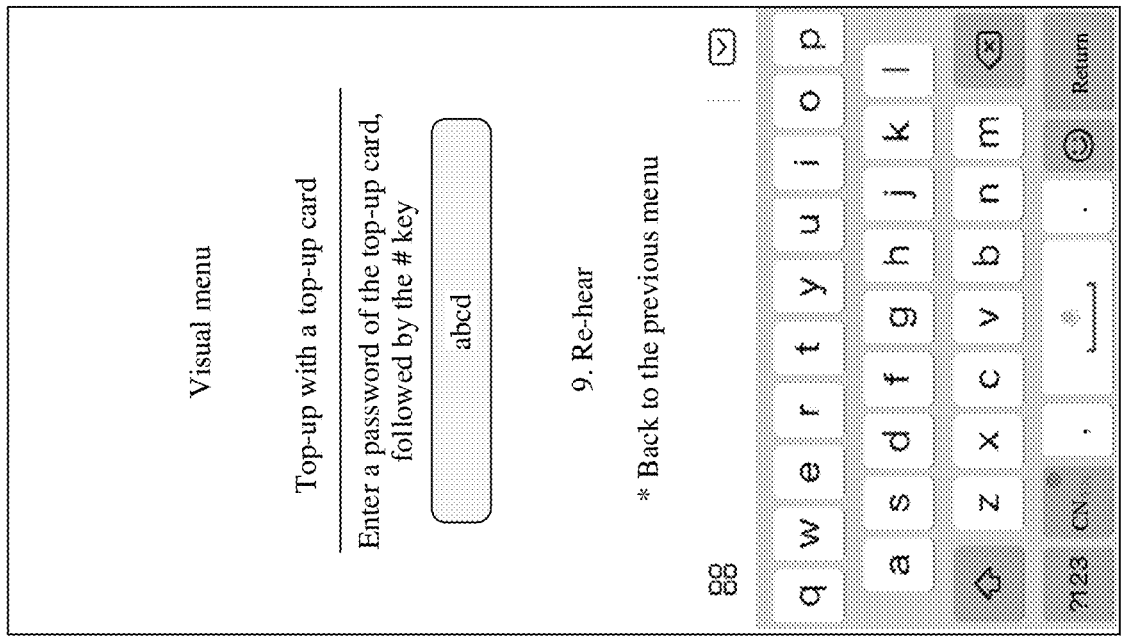
FIG. 6d is still another schematic diagram of a UI page corresponding to user operation information according to an embodiment of this application.
Figure 6D:
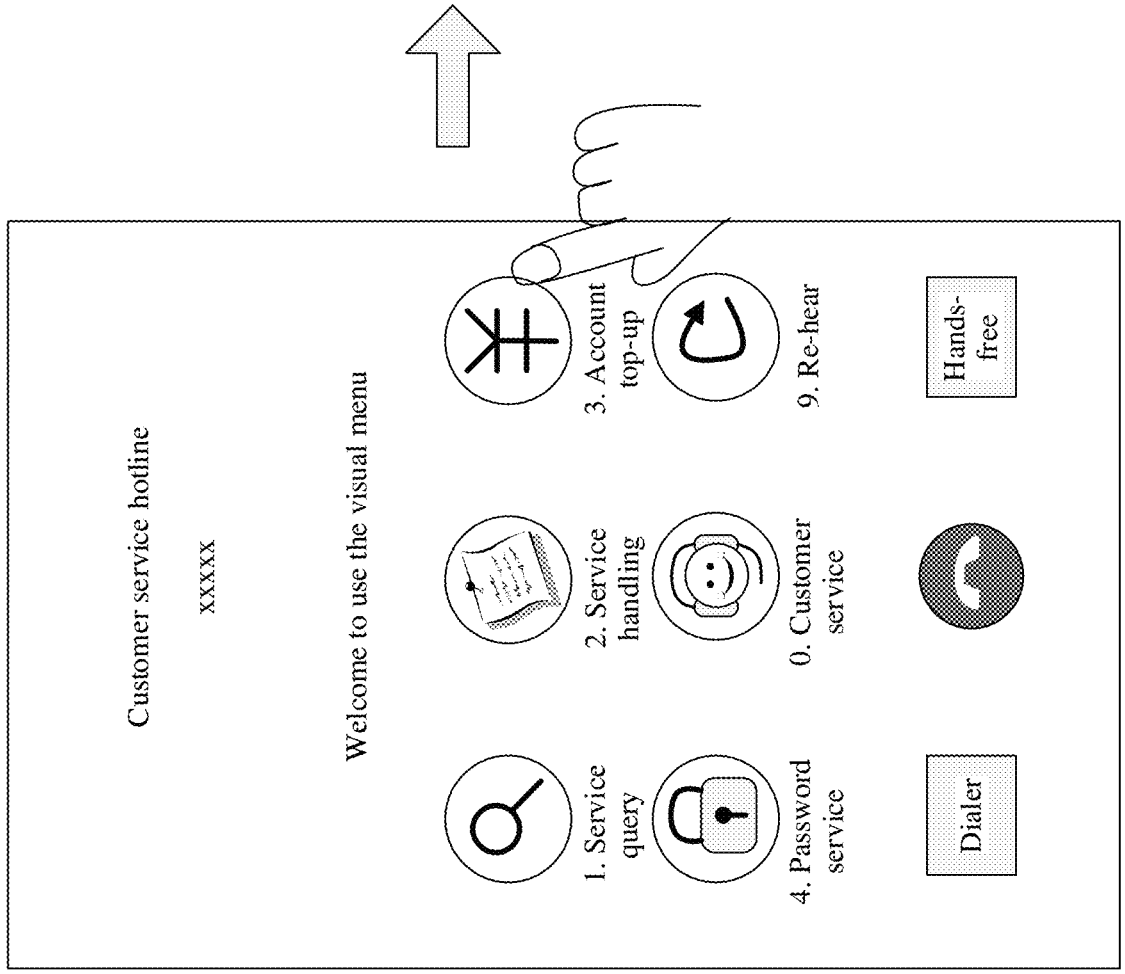
Figure 7D:
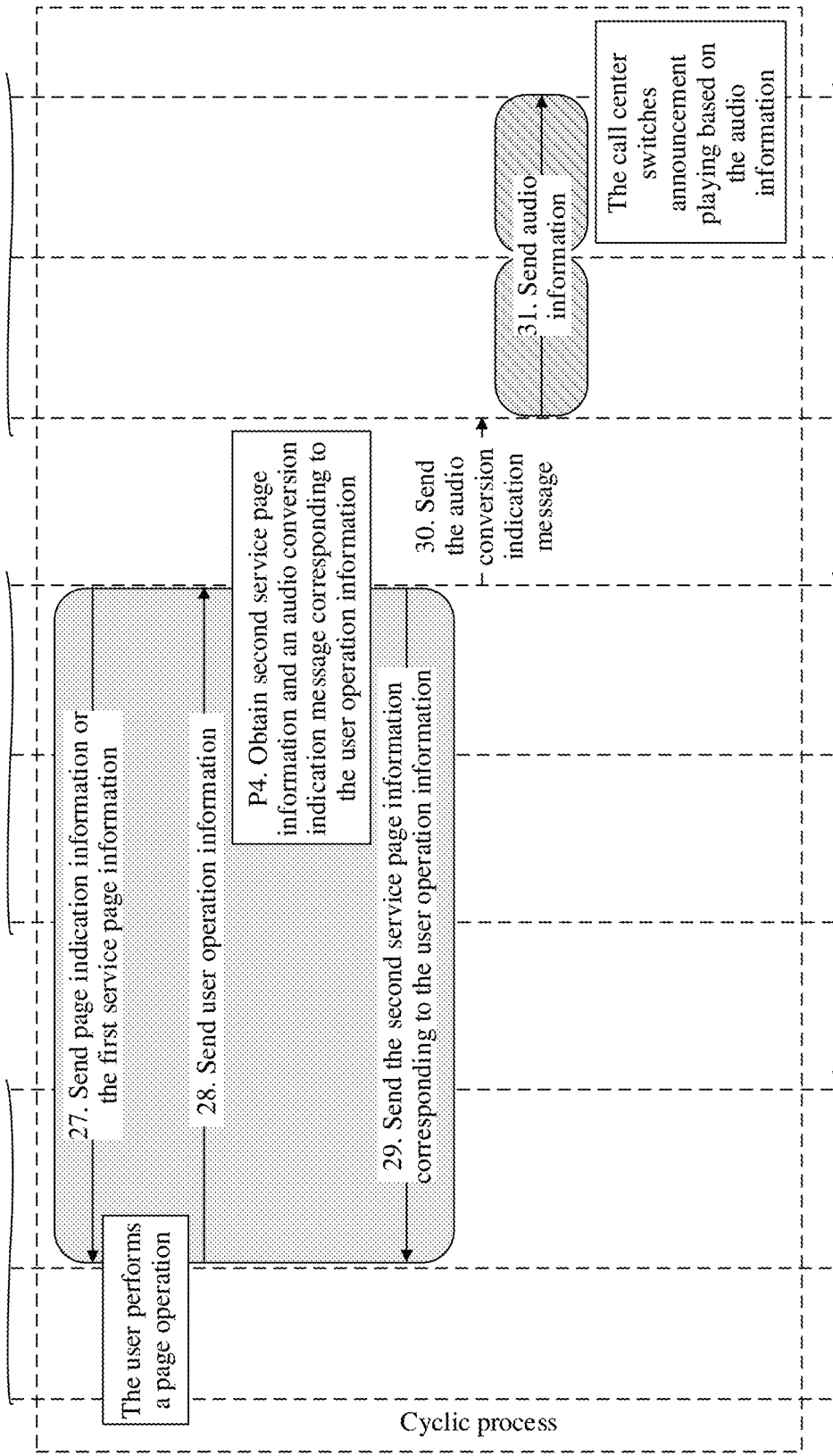
Figure 7F:
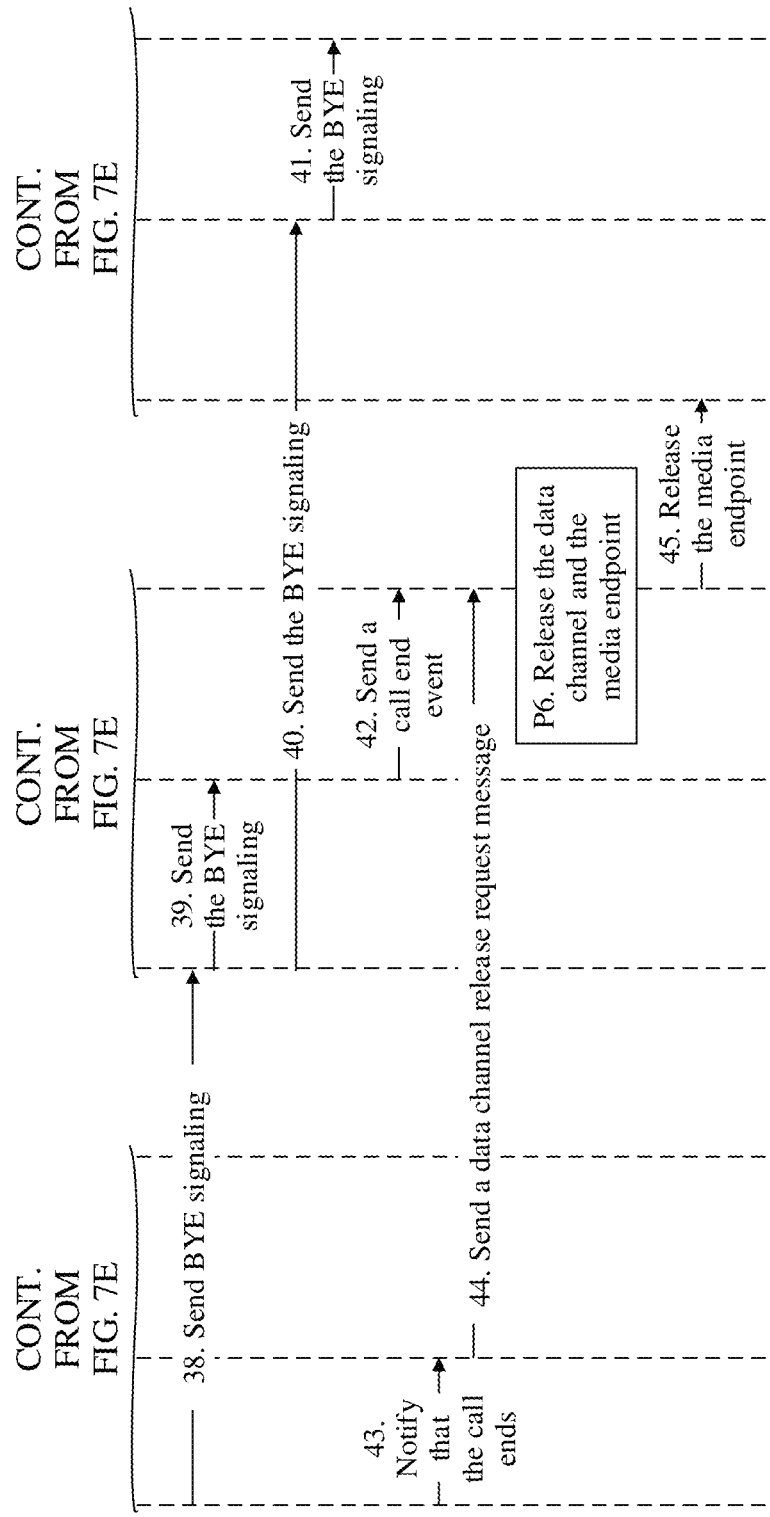
Figure 8E:
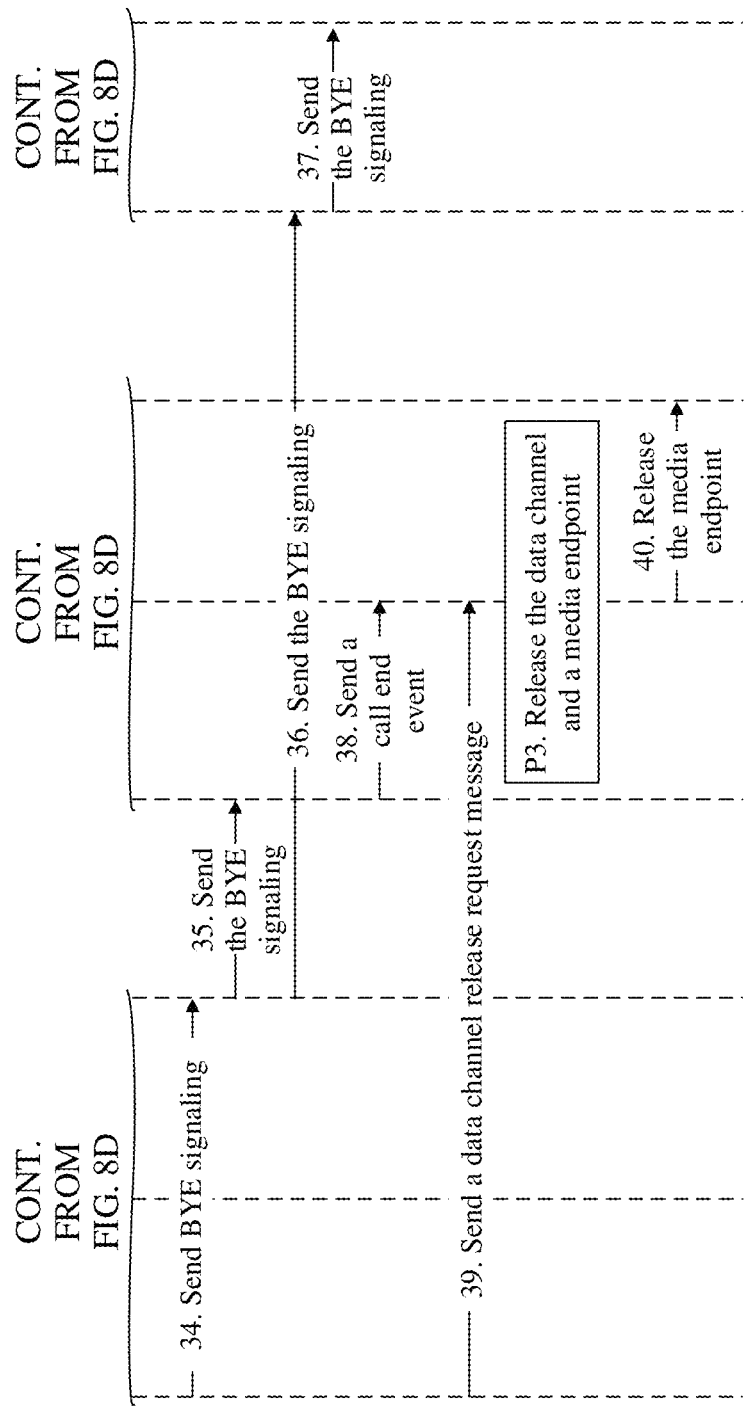

Optionally, when the user operation information is returning to an upper-level UI page, for example, when the user taps "* Back to the previous menu" on the UI page shown on the left side of FIG. 6b, a UI page corresponding to the user operation information is shown in FIG. 6a. In this case, the terminal device may directly obtain the upper-level UI page from the cached UI pages, without re-requesting the application server to obtain the UI page corresponding to the user operation information. FIG. 6d is still another schematic diagram of a UI page corresponding to user operation information according to an embodiment of this application. When the user operates the call screen to return to a UI page shown on the left side of FIG. 6d, the user taps "3. Account top-up" again, that is, the user operation information is that the user taps "3. Account top-up" on the UI page shown on the left side of FIG. 6d. If the terminal device does not find, by searching the cached service page information, a UI page element and a control file (for example, a keyboard needs to be displayed) corresponding to the user operation information, the terminal device may send the user operation information to the application server, to request to obtain second service page information corresponding to the user operation information, for example, obtaining a UI page shown on the right side of FIG. 6d, and displaying the keyboard on the UI page by using a JS script.

In an example, the application server may further generate audio information based on the user operation information, and send the audio information to the call center. The audio information in this embodiment includes a DTMF signal. For example, the application server may perform DTMF conversion on the user operation information, convert the user operation information into a DTMF signal, and send the DTMF signal to the call center in band. According to the protocol standard, an IMS session service procedure based on 3GPP TS24.229 supports interaction in an audio, video, fax, and text manner through SIP OA negotiation, to support DTMF announcement playing and digit collection. That is, the application server generates audio information based on the user operation, and sends the audio information to the call center, so that synchronization between the interactive service in the data channel and the DTMF announcement playing in a media channel can be implemented.

In an implementation, to implement synchronization between the interactive service in the data channel and the DTMF announcement playing in the media channel, the application server may establish a media channel between the application server and the call center, and send the audio information to the call center through the media channel between the application server and the call center. The media channel is established between the terminal device and the call center when the call service is connected. For example, a media channel is established between the terminal device and a calling SBC, a media channel is established between the calling SBC and the called IMS core, and a media channel is established between the called IMS core and the call center. It can be learned that the foregoing media channel can implement voice interworking between the terminal device and the call center. Based on this, the application server serially connects the terminal, the application server and the call center to form a media channel between the terminal device and the call center. For example, the application server establishes the media channel between the terminal device and the calling SBC and the media channel between the terminal device and the called IMS core, to establish the media channel between the terminal device and the call center, and may send the audio information to the call center through the media channel.

In an example, if the terminal device does not need to use the interactive service during the call, for example, the user selects to transfer to a human customer service, the terminal device may send service termination operation information to the application server through the data channel, thereby releasing the data channel. The service termination operation information indicates to terminate the interactive service during the call. Correspondingly, the application server receives the service termination operation information from the terminal device, determines that the user no longer needs to use the data channel, and releases the data channel. In this example, when the user is transferred to the human customer service, the media channel between the terminal device and the call center remains connected. The application server may send announcement switching information to the media channel based on the service termination operation information. The call center receives the announcement switching information and transfers the call to the human customer service.

Optionally, if the terminal device no longer uses the interactive service during the call, for example, the user hangs up, the terminal device may send BYE signaling to the calling IMS core, and the calling IMS core forwards the BYE signaling to the telephony server. After receiving the BYE signaling, the telephony server determines that the user hangs up, and may send a call end event to the application server. Correspondingly, the application server receives the call end event, and releases the data channel based on the call end event. In this case, because the user has hung up, the media channel between the terminal device and the call center does not need to remain connected. The application server can also release the media channel between the application server and the call center.

An embodiment of this application provides a call processing method. The method may be implemented by interaction between an application server and a terminal device. The application server establishes a data channel between the application server and the terminal device when detecting that the terminal device initiates a call service, and obtains first service page information corresponding to the call service. The application server sends the first service page information to the terminal device through the data channel when detecting that the call service is connected, so that the terminal device displays a corresponding UI page on a call screen based on the first service page information. It can be learned that, the application server associates an original call service with an interactive data channel service, and the application server delivers service page information to the terminal device, so that the terminal device can implement an interactive service during a call. This helps improve efficiency of processing the call service by a call processing system.

The following describes in detail a service procedure when the call processing method in this embodiment of this application is used in the call processing system shown in FIG. 1a. FIG. 7A, FIG. 7B, FIG. 7C, FIG. 7D, FIG. 7E, and FIG. 7F are a schematic diagram of an interactive service processing procedure during a call according to an embodiment of this application. The terminal device in the call processing system in FIG. 1a may be a plug-in terminal, that is, an interactive service is implemented by using an enriched calling engine and an operating system. The enriched calling engine may register a detected call status of the terminal device with the operating system of the terminal device. The application service device (Enriched Calling, AS) subscribes to a call event from a telephony server (TAS), as indicated by a dotted arrow in the service procedure in FIG. 7A, FIG. 7B, FIG. 7C, FIG. 7D, FIG. 7E, and FIG. 7F.

In FIG. 7A, FIG. 7B, FIG. 7C, FIG. 7D, FIG. 7E, and FIG. 7F, devices that execute service procedures include a terminal device, a session border control device, a calling IMS core network device (including a call control server), a telephony server (including an open interface (open API)), an application service device, an application media device, a called IMS core network device, and a call center/called device. Specifically, the following service procedures are included.

Steps 1 to 5: A user makes a call; and the terminal device sends INVITE call signaling, and the INVITE call signaling is forwarded to the called IMS core network device (that is, a called IMS core) through the session border control device (a calling SBC device) and the calling IMS core network device (that is, a calling IMS core), and then is forwarded by the called IMS core network device to the call center/called device, as shown in steps 1, 4, and 5 in FIG. 7A, FIG. 7B, FIG. 7C, FIG. 7D, FIG. 7E, and FIG. 7F. The calling IMS core network device may further forward the INVITE call signaling to the telephony server, and the telephony server sends a call start event to the application service device based on the foregoing subscribed call event, as shown in steps 2 and 3 in FIG. 7A, FIG. 7B, FIG. 7C, FIG. 7D, FIG. 7E, and FIG. 7F.

Calling from the terminal device triggers the application service device in two manners:

Manner 1: Triggering from the telephony server (open API) to the application service device.

Manner 2: Triggering from the call control server (CSCF) to the application service device.

Optionally, when the user makes the call, the operating system of the terminal device obtains a call start event, and sends the call start event to the enriched calling engine, as shown in step 1.1 in FIG. 7A, FIG. 7B, FIG. 7C, FIG. 7D, FIG. 7E, and FIG. 7F.

Step P1: The enriched calling engine of the terminal device performs authentication. Authentication manners shown in step P1 may include IMS GBA authentication between the terminal device and an IMS network (for example, access authentication), or unidirectional authentication from the terminal device to an application server (for example, third-party login authentication). For a specific implementation, refer to the descriptions of the authentication manners in the foregoing embodiment. Details are not described herein again.

Step 6: After passing the authentication, the enriched calling engine of the terminal device sends a data channel establishment request message to the application service device. The data channel establishment request message includes an authentication token (Token).

Step P2: The application service device verifies the authentication token on a corresponding authentication server in the authentication manner of P1.

Step 7: The application service device verifies the token on the corresponding authentication server in the authentication manner of the terminal device. After the verification succeeds, the application service device sends a data channel connection response message to the terminal device, and establishes a data channel between the application service device and the enriched calling engine of the terminal device.

Step 8: The enriched calling engine sends the call start event to the application service device through the data channel. The call start event may include a calling number and a called number of the current call.

Step 9: The application service device obtains, based on the call start event of the telephony server and/or the call start event sent by the enriched calling engine, first service page information corresponding to the call start event, and sends the first service page information to the enriched calling engine.

For example, the application service device may obtain the first service page information corresponding to the called number in the call start event. The application service device may further create a session and record a session identifier (identify, ID). In this case, the application service device may first send the first service page information to the terminal device. After receiving the first service page information, the terminal device may first cache the first service page information, and then display a corresponding UI page after confirming that the call service is connected. For detailed description of the first service page information, refer to the description of the first service page information in the foregoing embodiment. Details are not described herein again.

Step P3: The enriched calling engine receives the first service page information, and downloads a corresponding UI page and control file. If the application service device sends a URL of an HTML5 page, the enriched calling engine downloads the entire HTML5 page from a corresponding content server, and whether to cache or directly display the HTML5 page depends on whether the call is connected (that is, after confirming that the call service is connected, the terminal device displays the corresponding UI page).

Steps 10 to 13: The call center/called device sends a 183 message to the called IMS core network device, where the 183 message indicates that the call is in progress. The called IMS core network device sends the 183 message to the calling IMS core network device, and a media channel is established between the calling side (the terminal device) and the called side (the call center/the called device). The calling IMS core network device may further separately send the 183 message to the telephony server and the enriched calling engine, and a media channel is established between the terminal device and the call center/the called device.

The established media channel is used to transmit audio/video data.

Steps 14 to 17: The call center/called device sends a 180 message to the called IMS core network device, where the 180 message indicates that the call is ringing. The called IMS core network device sends the 180 message to the calling IMS core network device, to indicate that the called side is ringing. The calling IMS core network device may further separately send the 180 message to the telephony server and the enriched calling engine, to indicate that the called side is ringing.

Step 18: The telephony server sends a call ringing event to the application service device based on a call subscription event.

After receiving the call ringing event, the application service device may send updated service page information to the terminal device.

Steps 19 to 21: After obtaining a media endpoint from the enriched calling media device (an IP address and/or port number of the application media device), the application service device updates original (original) O-side media and terminal (terminal) T-side media through SIP negotiation, and serially connects the terminal, the application media device and the call center to form a media channel, so that an interaction operation of the user can be converted into an in-band signal for transmission in the media channel. The O side refers to the terminal device, and the T side refers to the call center/called device.

As shown in FIG. 7A, FIG. 7B, FIG. 7C, FIG. 7D, FIG. 7E, and FIG. 7F, after the application media device is serially connected into the media channel, the media channel between the terminal device and the call center includes four segments, namely, the terminal device-the session border control device-the application media device-the called IMS core network device-the call center/the called device.

Steps 22 to 25: The call center/called device sends a 200 ok message (200 message for short) to the called IMS core network device, where the 200 message indicates that the call is connected, and the call center starts to play an announcement (or the terminal device starts to talk with the called device). The called IMS core network device sends the 200 message to the calling IMS core network device. The calling IMS core network device may further separately send the 200 message to the telephony server and the enriched calling engine, to indicate that the call has been connected.

Step 26: The telephony server sends a call connection event to the application service device based on the call subscription event.

Step 27: The application service device sends page indication information to the enriched calling engine through the data channel. Optionally, if the enriched calling engine has pre-cached the first service page information, a UI page may be displayed on an audio/video call screen based on the page indication information. If the terminal device refreshes the UI page after the call service is connected, the application service device may send new service page information to the enriched calling engine through the data channel.

Step 28: After the user performs the page operation, the operating system of the terminal device obtains user operation information corresponding to the page operation performed by the user, and the enriched calling engine sends the user operation information to the application service device through the data channel.

Step P4: The application service device performs service identification based on the reported user operation information, and obtains second service page information based on the user operation information, or obtains an audio conversion indication message based on the user operation information.

Steps 29 to 31: The application service device sends the audio conversion indication message to the application media device. Correspondingly, the application media device receives the audio conversion indication message, and generates audio information based on the audio conversion indication information, to convert the user operation into the audio information (for example, a DTMF signal). The application media device then sends the audio information to the call center/called device in band.

The application service device further sends the second service page information to the enriched calling engine through the data channel. Correspondingly, after receiving the second service page information, the enriched calling engine may download the corresponding UI page and control file (same as step P3). Steps 27 to 31 in this embodiment may be cyclic, that is, the user may perform page operations for a plurality of times s, and the application service device and the application media device may also perform corresponding operations for a plurality of times based on the user operation information.

Optionally, in this embodiment, if the user selects to actively close the second service page information displayed on the UI page or selects to transfer to a human customer service, steps 32 to 37 may be further included.

Step 32: After the user performs the page operation, the operating system obtains service termination operation information corresponding to the page operation performed by the user, and the enriched calling engine sends the service termination operation information to the application service device through the data channel, to terminate the current interactive service.

Step P5: The application service device performs service identification based on the service termination operation information, and obtains a service termination indication message based on the service termination operation information.

Steps 33 to 35: The application service device determines, based on the service termination operation information, that the terminal device does not need the data channel (for example, the user actively closes the second service page information displayed on the UI page or transfers to the human customer service), the application service device releases the data channel between the with application service and the enriched calling engine.

For example, if the user selects to transfer to the customer service, the application service device further sends transferring-to-human indication information to the application media device, to indicate the application media device to convert the operation of transferring to the customer service into the audio information, and the application media device sends the audio information to the call center in band. The call center switches to the human customer service.

Steps 36 and 37: The application service device updates the O/T-side media through SIP negotiation, and the application media device exits the media channel.

Steps 38 to 41: After completing the interactive service, the user performs a hang-up operation, and the terminal device may send BYE signaling, where the BYE signaling is forwarded to the called IMS core network device through the calling IMS core network device, and then forwarded by the called IMS core network device to the call center/called device.

Step 42: The telephony server sends a call end event to the application service device based on the call subscription event.

Step 43: The operating system of the terminal device captures the call end event, and notifies the enriched calling engine that the call ends.

Step 44: The enriched calling engine of the terminal device sends a data channel release request message to the application service device, and the terminal device may also release an audio/video media channel synchronously.

Step P6 and step 45: The application service device releases the data channel and releases the media endpoint.

In this embodiment, if the application service device has released the data channel in step 34, steps 44 and 45 may not be performed.

In conclusion, when the call processing method provided in this embodiment of this application is applied to the call processing system shown in FIG. 1*a*, the overall service procedure is shown in FIG. 7A, FIG. 7B, FIG. 7C, FIG. 7D, FIG. 7E, and FIG. 7F. To be specific, starting from sending the INVITE call signaling by the terminal device, the interactive service during the call is implemented when the user makes the call. The interactive service during the call may be terminated when the user transfers to the human customer service, the user actively closes an interactive page, or the terminal device sends the BYE signaling (that is, the user hangs up).

The following describes in detail a service procedure when the call processing method in this embodiment of this application is used in the call processing system shown in FIG. 1B. FIG. 8A, FIG. 8B, FIG. 8C, FIG. 8D, and FIG. 8E are a schematic diagram of another interactive service processing procedure during a call according to an embodiment of this application. The terminal device in the call processing system shown in FIG. 1B is a native terminal, that is, a DCMTSI client specified in a protocol (including a data channel and a web engine that support an interactive service during a call) to implement the interactive service during the call. The application service device (Enriched Calling, AS) may subscribe to a call event from a telephony server (TAS), as indicated by a dotted arrow in the service procedure in FIG. 8A, FIG. 8B, FIG. 8C, FIG. 8D, and FIG. 8E.

In FIG. 8A, FIG. 8B, FIG. 8C, FIG. 8D, and FIG. 8E, devices that execute the entire service procedure include a terminal device, a session border control device, a calling IMS core network device (including a call control server), a telephony server (including an open interface), an application service device (including a data channel server (data channel server, DCS)), an application media device, a called IMS core network device, and a call center/called device. The following service procedures are specifically included.

Steps 1 to 9: The native terminal establishes a data channel (for example, a bootstrap data channel) through SIP signaling negotiation.

Transmission of an INVITE message between the terminal device and the call center/called device, and transmission of a 183 message between the terminal device and the call center/called device are similar to the transmission processes in FIG. 7A, FIG. 7B, FIG. 7C, FIG. 7D, FIG. 7E, and FIG. 7F. For details, refer to descriptions in steps 1 to 5 and steps 10 to 13 in FIG. 7A, FIG. 7B, FIG. 7C, FIG. 7D, FIG. 7E, and FIG. 7F. Details are not described herein again. The INVITE message in FIG. 8A, FIG. 8B, FIG. 8C, FIG. 8D, and FIG. 8E includes related information of the data channel. For example, the INVITE message includes information such as an attribute of the data channel, quality of service, and a flow ID, and is used to perform data channel negotiation.

Optionally, in this embodiment, the native terminal may further establish the data channel through negotiation by using another message. For example, the application service device negotiates with the terminal device to establish the data channel by using an UPDATE message, or the application service device negotiates with the terminal device to establish the data channel by using a Re-Invite message.

Step 10: After the native terminal establishes the data channel between the native terminal and the application service device, the terminal device sends a data channel application request message to the application service device through the data channel, to request to obtain a data channel application corresponding to the current call service (whose function is similar to the call start event in step 8 in FIG. 7A, FIG. 7B, FIG. 7C, FIG. 7D, FIG. 7E, and FIG. 7F). The data channel application request message may also include a calling number/called number, so that the application service device associates the data channel application request message with the INVITE message in steps 1 to 5.

For example, the native terminal sends the data channel application request message to an ECS-AS to request to obtain the data channel application of the call center/called device (similar to the first service page information in FIG. 7). The data channel application (data channel application, DC APP) includes an HTML web page (including a JS script), an image, a style sheet, and the like.

Optionally, the data channel server described in 3GPP TS 26.114 is configured to establish the data channel between the data channel server and the native terminal, and may distribute the data channel application to the terminal device. That is, the DCS may also implement the function of the ECS-AS in the interactive service processing procedure during the call.

Step 11: The application service device sends the corresponding data channel application to the terminal device (similar to step 9 in FIG. 7A, FIG. 7B, FIG. 7C, FIG. 7D, FIG. 7E, and FIG. 7F).

Optionally, the application service device includes a data channel repository (data channel repository, DCR) function described in 3GPP TS26.114, and the data channel repository may be configured to store the data channel application of the native terminal. That is, the data channel repository can also implement functions similar to the CS in the interactive service processing protrude during the call. The data channel repository can be deployed independently or deployed together with the application service device.

Steps 12 to 21: The terminal device transmits a 180 message and a 200 ok message to the call center/called device. The transmission process of the 180 message and the 200 message between the terminal device and the call center/called device is similar to the transmission process in FIG. 7. For details, refer to descriptions in steps 14 to 25 in FIG. 7A, FIG. 7B, FIG. 7C, FIG. 7D, FIG. 7E, and FIG. 7F. Details are not described herein again.

Steps 22 and 23: After the terminal device operates the data channel application of the call center/called device, for example, when the terminal device allows use of the data channel application of the call center/called device, a corresponding application data channel (for example, a non-bootstrap data channel) is established between the terminal device and the call center/called device.

The native terminal may establish only the data channel between the native terminal and the ECS-AS, and does not need to establish application data channels for different applications. That is, the data channel application between the terminal device and the ECS-AS may be directly transmitted on the data channel, that is, steps 22 and 23 are optional steps in this embodiment.

Optionally, for a business-to-customer (business-to-customer, B2C) or customer-to-business (customer-to-business, C2B) service, a unilateral application data channel may be established (for example, the non-bootstrap data channel between the terminal device and the application service device). For a customer-to-customer (customer-to-customer, C2C) service, a non-bootstrap data channel can be established between a calling-terminal device and a called-terminal device. For a B2C or C2B service, the data channel application between the terminal device and the application service device may be the first service page information or the second service page information in the foregoing embodiment. For the C2C service, the data channel application between the calling-side terminal device and the called-side terminal device may be a call card. For example, the calling-side terminal device may send the call card to the called-side terminal device. The call card may be considered as an initial service page, including a UI page element, and indicates identity information, an incoming call intention, or the like of the calling-side terminal device.

Steps 24 to 27: The call center/called device obtains user operation information of the terminal device, and plays an announcement based on the user operation information. The native terminal has two possible implementations. One manner is consistent with that of the plug-in terminal. A user enters an operation by tapping an icon on the UI page, and the terminal device converts the user operation into user operation information, and sends the user operation information to the application service device through the data channel. The application service device indicates the application media device to convert the user operation information into audio information (such as a DTMF signal), and sends the audio information to the call center/called device through a media channel. In another manner, when the terminal device sends the user operation information to the application service device through the data channel, the terminal device directly sends the audio information corresponding to the user operation information to the call center/called device through the media channel, and the application service device does not need to perform conversion between the reported operation and the DTMF.

Steps 28 to 40: Both the data channel and the media channel between the terminal device and the call center/called device are released. The processes of releasing the data channel and the media channel are similar to the processes of releasing the data channel and the media channel in FIG. 7A, FIG. 7B, FIG. 7C, FIG. 7D, FIG. 7E, and FIG. 7F. For details, refer to descriptions in steps 32 to 45 in FIG. 7A, FIG. 7B, FIG. 7C, FIG. 7D, FIG. 7E, and FIG. 7F. Details are not described herein again.

In conclusion, when the call processing method provided in this embodiment of this application is applied to the call processing system shown in FIG. 1B, the overall service procedure is similar to that in FIG. 7A, FIG. 7B, FIG. 7C, FIG. 7D, FIG. 7E, and FIG. 7F. A difference lies in that types of the established data channels are different. Therefore, some steps are different, but natures of the two service procedures are the same.

The foregoing describes in detail the call processing method and the call processing system in embodiments of this application with reference to FIG. 1a to FIG. 8A, FIG. 8B, FIG. 8C, FIG. 8D, and FIG. 8E. The following describes in detail a call processing apparatus and a related device in embodiments of this application with reference to FIG. 9 to FIG. 12. It should be understood that the call processing apparatuses and related devices shown in FIG. 9 to FIG. 12 can implement one or more steps in the method procedures shown in FIG. 4, FIG. 7A, FIG. 7B, FIG. 7C, FIG. 7D, FIG. 7E, and FIG. 7F, and FIG. 8A, FIG. 8B, FIG. 8C, FIG. 8D, and FIG. 8E. To avoid repetition, details are not described herein again.

Figure 9:
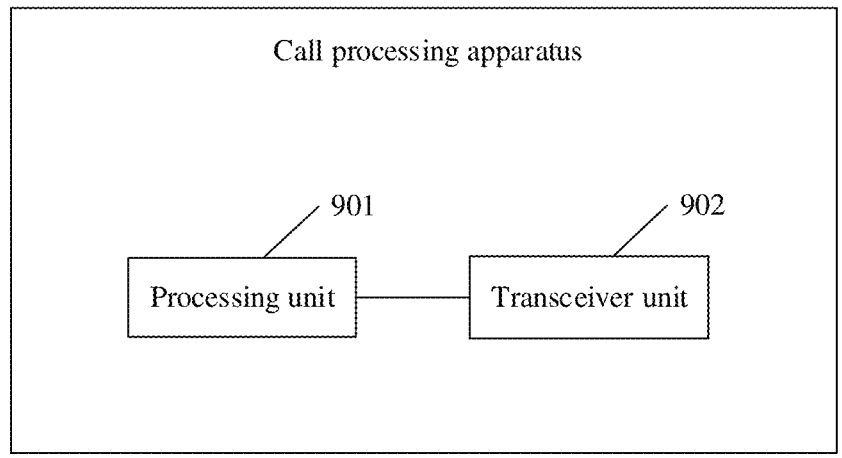
FIG. 9 is a schematic diagram of a structure of a call processing apparatus according to an embodiment of this application.

FIG. 9 is a schematic diagram of a structure of a call processing apparatus according to an embodiment of this application. The call processing apparatus shown in FIG. 9 is configured to implement the method performed by the application server in the embodiment shown in FIG. 4, and includes a processing unit 901 and a transceiver unit 902. The processing unit 901 is configured to establish a data channel between the application server and a terminal device when detecting that the terminal device initiates or receives a call service. The processing unit 901 is further configured to obtain first service page information corresponding to the call service. The transceiver unit 902 is configured to send the first service page information to the terminal device through the data channel when detecting that the call service is connected.

In an implementation, the transceiver unit 902 is configured to send a UI page element and a control file that are in the first service page information to the terminal device, or the transceiver unit 902 is configured to send URLs of the UI page element and the control file that are in the first service page information to the terminal device.

In an implementation, the transceiver unit 902 is configured to receive a call start event from a telephony server, and the processing unit 901 is configured to determine, based on the call start event, that the terminal device initiates the call service. Alternatively, the transceiver unit 902 is configured to receive a data channel establishment request message from the terminal device, and the processing unit 901 is configured to determine, based on the data channel establishment request message, that the terminal device initiates the call service.

In an implementation, the transceiver unit 902 is configured to receive a called start event from a telephony server, and the processing unit 901 is configured to determine, based on the called start event, that the terminal device receives the call service. Alternatively, the transceiver unit 902 is configured to receive a data channel establishment request message from the terminal device, and the processing unit 901 is configured to determine, based on the data channel establishment request message, that the terminal device initiates or receives the call service.

In an implementation, the transceiver unit 902 is configured to receive a call response message from a telephony server or the terminal device, and the processing unit 901 is configured to determine, based on the call response message, that the terminal device receives the call service.

In an implementation, the call response message is a 200 ok message.

In an implementation, the transceiver unit 902 is configured to receive a call connection event from a telephony server, and the processing unit 901 is configured to determine, based on the call connection event, that the call service of the terminal device is connected. Alternatively, the transceiver unit 902 is configured to receive a call notification message from the terminal device, and the processing unit 901 is configured to determine, based on the call notification message, that the call service of the terminal device is connected.

In an implementation, the processing unit 901 is configured to obtain the corresponding first service page information based on one of the call start event, the call notification message, or the call connection event.

In an implementation, the processing unit 901 is configured to obtain, based on a called number included in the call start event, the first service page information corresponding to the called number.

In an implementation, the transceiver unit 902 is configured to receive user operation information from the terminal device through the data channel. The processing unit 901 is configured to obtain corresponding second service page information based on the user operation information, and the transceiver unit 902 is configured to send the second service page information to the terminal device.

In an implementation, the transceiver unit 902 is configured to receive user operation information from the terminal device through the data channel. The processing unit 901 is configured to generate audio information based on the user operation information, and the transceiver unit 902 is configured to send the audio information to a call center.

In an implementation, the processing unit 901 is configured to establish a media channel between the application server and the call center, and the transceiver unit 902 is configured to send the audio information to the call center through the media channel. Optionally, the processing unit 901 is configured to serially connect the terminal, the application server and the call center to form a media channel between the terminal device and the call center, so as to establish the media channel between the application server and the call center.

In an implementation, the transceiver unit 902 is configured to send page indication information to the terminal device through the data channel, where the page indication information indicates the terminal device to display a UI page corresponding to the first service page information or to cache the corresponding UI page.

In an implementation, the transceiver unit 902 is configured to receive service termination operation information from the terminal device through the data channel, and the processing unit 901 is configured to release the data channel. The service termination operation information indicates to terminate an interactive service during a call.

In an implementation, the transceiver unit 902 is configured to receive a call end event from a telephony server, and the processing unit 901 is configured to release the data channel based on the call end event.

In an implementation, the processing unit 901 is configured to: when detecting that the terminal device initiates the call service, establish a data channel between the application server and the terminal device if authentication of the terminal device succeeds.

Figure 10:
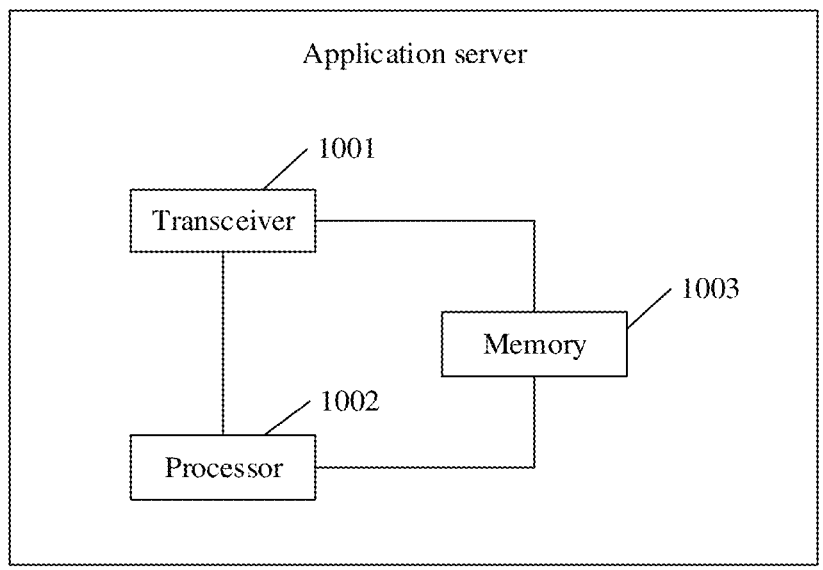
FIG. 10 is a schematic diagram of a structure of an application server according to an embodiment of this application.

In an implementation, related functions implemented by the units in FIG. 9 may be implemented by using a transceiver and a processor. FIG. 10 is a schematic diagram of a structure of an application server according to an embodiment of this application. The application server may be a device (for example, a chip) having a call processing function in the embodiment shown in FIG. 4. The application server may include a transceiver 1001, at least one processor 1002, and a memory 1003. The transceiver 1001, the processor 1002, and the memory 1003 may be connected to each other through one or more communication buses, or may be connected to each other in another manner.

The transceiver 1001 may be configured to send data or receive data. It may be understood that the transceiver 1001 is a general term, and may include a receiver and a transmitter. For example, the receiver is configured to receive user operation information from a terminal device. For another example, the transmitter is configured to send first service page information to the terminal device.

The processor 1002 may be configured to process data of the application server, for example, obtain first service page information corresponding to a call service. The processor 1002 may include one or more processors. For example, the processor 1002 may be one or more central processing units (central processing unit, CPU), one or more network processors (network processor, NP), one or more hardware chips, or any combination thereof. When the processor 1002 includes one CPU, the CPU may be a single-core CPU, or may be a multi-core CPU.

The memory 1003 is configured to store the program code and the like. The memory 1003 may include a volatile memory (volatile memory), for example, a random access memory (random access memory, RAM). Alternatively, the memory 1003 may include a non-volatile memory (non-volatile memory), for example, a read-only memory (read-only memory, ROM), a flash memory (flash memory), a hard disk drive (hard disk drive, HDD), or a solid-state drive (solid-state drive, SSD). Alternatively, the memory 1003 may include a combination of the foregoing types of memories.

The processor 1002 and the memory 1003 may be coupled through an interface, or may be integrated together. This is not limited in this embodiment.

The transceiver 1001 and the processor 1002 may be configured to implement the call processing method in the embodiment shown in FIG. 4. Specific implementations are as follows.

The processor 1002 is configured to establish a data channel between the application server and a terminal device when detecting that the terminal device initiates or receives a call service. The processor 1002 is further configured to obtain first service page information corresponding to the call service. The transceiver 1001 is configured to send the first service page information to the terminal device through the data channel when detecting that the call service is connected.

In an implementation, the transceiver 1001 is configured to send a UI page element and a control file that are in the first service page information to the terminal device, or the transceiver 1001 is configured to send URLs of the UI page element and the control file that are in the first service page information to the terminal device.

In an implementation, the transceiver 1001 is configured to receive a call start event from a telephony server, and the processor 1002 is configured to determine, based on the call start event, that the terminal device initiates the call service. Alternatively, the transceiver 1001 is configured to receive a data channel establishment request message from the terminal device, and the processor 1002 is configured to determine, based on the data channel establishment request message, that the terminal device initiates the call service.

In an implementation, the transceiver 1001 is configured to receive a called start event from a telephony server, and the processor 1002 is configured to determine, based on the called start event, that the terminal device receives the call service. Alternatively, the transceiver 1001 is configured to receive a data channel establishment request message from the terminal device, and the processor 1002 is configured to determine, based on the data channel establishment request message, that the terminal device initiates or receives the call service.

In an implementation, the transceiver 1001 is configured to receive a call response message from a telephony server or the terminal device, and the processor 1002 is configured to determine, based on the call response message, that the terminal device receives the call service.

In an implementation, the call response message is a 200 ok message.

In an implementation, the transceiver 1001 is configured to receive a call connection event from a telephony server, and the processor 1002 is configured to determine, based on the call connection event, that the call service of the terminal device is connected. Alternatively, the transceiver 1001 is configured to receive a call notification message from the terminal device, and the processor 1002 is configured to determine, based on the call notification message, that the call service of the terminal device is connected.

In an implementation, the processor 1002 is configured to obtain the corresponding first service page information based on one of the call start event, the call notification message, or the call connection event.

In an implementation, the processor 1002 is configured to obtain, based on a called number included in the call start event, the first service page information corresponding to the called number.

In an implementation, the transceiver 1001 is configured to receive user operation information from the terminal device through the data channel. The processor 1002 is configured to obtain corresponding second service page information based on the user operation information, and the transceiver 1001 is configured to send the second service page information to the terminal device.

In an implementation, the transceiver 1001 is configured to receive the user operation information from the terminal device through the data channel. The processor 1002 is configured to generate audio information based on the user operation information, and the transceiver 1001 is configured to send the audio information to a call center.

In an implementation, the processor 1002 is configured to establish a media channel between the application server and the call center, and the transceiver 1001 is configured to send the audio information to the call center through the media channel. Optionally, the processor 1002 is configured to serially connect the terminal, the application server and the call center to form a media channel between the terminal device and the call center, so as to establish the media channel between the application server and the call center.

In an implementation, the transceiver 1001 is configured to send page indication information to the terminal device through the data channel, where the page indication information indicates the terminal device to display a UI page corresponding to the first service page information or to cache the corresponding UI page.

In an implementation, the transceiver 1001 is configured to receive service termination operation information from the terminal device through the data channel, and the processor 1002 is configured to release the data channel. The service termination operation information indicates to terminate an interactive service during a call.

In an implementation, the transceiver 1001 is configured to receive a call end event from a telephony server, and the processor 1002 is configured to release the data channel based on the call end event.

In an implementation, the processor 1002 is configured to: when detecting that the terminal device initiates the call service, establish a data channel between the application server and the terminal device if authentication of the terminal device succeeds.

Figure 11:
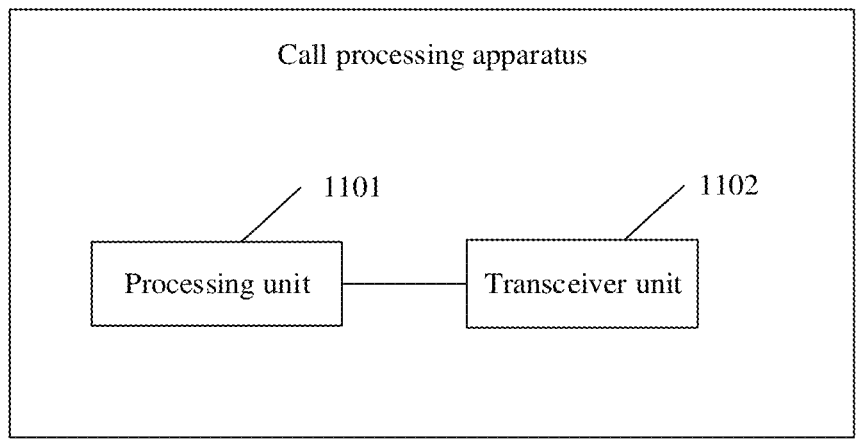
FIG. 11 is a schematic diagram of another structure of a call processing apparatus according to an embodiment of this application.

FIG. 11 is a schematic diagram of another structure of a call processing apparatus according to an embodiment of this application. The call processing apparatus shown in FIG. 11 is configured to implement the method performed by the terminal device in the embodiment shown in FIG. 4, and includes a processing unit 1101 and a transceiver unit 1102. When initiating or receiving a call service, the processing unit 1101 is configured to establish a data channel between the terminal device and an application server. The transceiver unit 1102 is configured to receive, through the data channel, first service page information corresponding to the call service. The processing unit 1101 displays a corresponding UI page on a call screen based on the first service page information when the call service is connected.

In an implementation, the transceiver unit 1102 is configured to receive, through the data channel, a UI page element and a control file that are included in the first service page information. Alternatively, the transceiver unit 1102 is configured to receive, through the data channel, URLs of the UI page element and the control file that are included in the first service page information.

In an implementation, the processing unit 1101 is configured to establish a media channel between the terminal device and a call center, and receive a media stream of a call through the media channel.

In an implementation, the processing unit 1101 is configured to establish a media channel between the terminal device and a call center by using a border gateway controller, and receive a media stream of a call through the media channel.

In an implementation, the transceiver unit 1102 is configured to receive a 183 message from a call control server, and send a call start event to the application server.

In an implementation, the transceiver unit 1102 is configured to receive a 200 message from a call control server, and send a call notification message to the application server.

In an implementation, the processing unit 1101 is configured to obtain user operation information; and the transceiver unit 1102 is configured to send the user operation information to the application server through the data channel, and receive, through the data channel, second service page information corresponding to the user operation information.

In an implementation, the transceiver unit 1102 is configured to receive page indication information from the application server through the data channel, where the page indication information indicates the terminal device to display the UI page corresponding to the first service page information or to cache the UI page.

In an implementation, the processing unit 1101 is configured to display a corresponding UI page based on the first service page information in a manner of covering the call screen. Alternatively, the processing unit 1101 is configured to display, in a floating window above the call screen, a UI page corresponding to the first service page information.

In an implementation, the transceiver unit 1102 is configured to send service termination operation information to the application server through the data channel, where the service termination operation information indicates to terminate an interactive service during a call.

In an implementation, the processing unit 1101 is configured to: when initiating or receiving a call service, establish a data channel between the terminal device and the application server if authentication of the terminal device succeeds.

Figure 12:
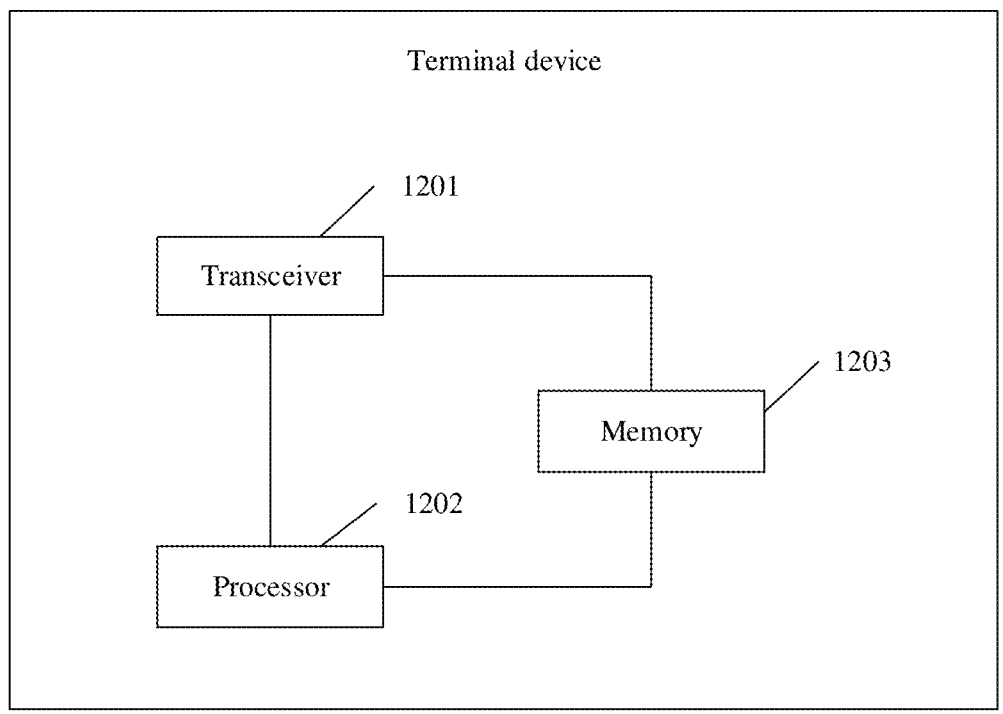
FIG. 12 is a schematic diagram of a structure of a terminal device according to an embodiment of this application.

In an implementation, related functions implemented by the units in FIG. 11 may be implemented by using a transceiver and a processor. FIG. 12 is a schematic diagram of a structure of a terminal device according to an embodiment of this application. The terminal device may include a transceiver 1201, at least one processor 1202, and a memory 1203. The transceiver 1201, the processor 1202, and the memory 1203 may be connected to each other through one or more communication buses, or may be connected to each other in another manner.

The transceiver 1201 may be configured to send data or receive data. It may be understood that the transceiver 1201 is a general term, and may include a receiver and a transmitter. For example, the transmitter is configured to send user operation information to an application server. For another example, the receiver is configured to receive first service page information from the application server.

The processor 1202 may be configured to process data of the terminal device, for example, display a corresponding UI page on a call screen based on the first service page information. The processor 1202 may include one or more processors. For example, the processor 1202 may be one or more central processing units (central processing unit, CPU), one or more network processors (network processor, NP), one or more hardware chips, or any combination thereof. When the processor 1202 includes one CPU, the CPU may be a single-core CPU, or may be a multi-core CPU.

The memory 1203 is configured to store the program code and the like. The memory 1203 may include a volatile memory (volatile memory), for example, a random access memory (random access memory, RAM). Alternatively, the memory 1203 may include a non-volatile memory (non-volatile memory), for example, a read-only memory (read-only memory, ROM), a flash memory (flash memory), a hard disk drive (hard disk drive, HDD), or a solid-state drive (solid-state drive, SSD). Alternatively, the memory 1203 may include a combination of the foregoing types of memories.

The processor 1202 and the memory 1203 may be coupled through an interface, or may be integrated together. This is not limited in this embodiment.

The transceiver 1201 and the processor 1202 may be configured to implement the call processing method in the embodiment shown in FIG. 4. Specific implementations are as follows.

When initiating or receiving a call service, the processor 1202 is configured to establish a data channel between the terminal device and an application server. The transceiver 1201 is configured to receive, through the data channel, first service page information corresponding to the call service. The processor 1202 displays a corresponding UI page on a call screen based on the first service page information when the call service is connected.

In an implementation, the transceiver 1201 is configured to receive, through the data channel, a UI page element and a control file that are included in the first service page information. Alternatively, the transceiver 1201 is configured to receive, through the data channel, URLs of the UI page element and the control file that are included in the first service page information.

In an implementation, the processor 1202 is configured to establish a media channel between the terminal device and a call center, and receive a media stream of a call through the media channel.

In an implementation, the processor 1202 is configured to establish a media channel between the terminal device and a call center by using a border gateway controller, and receive a media stream of a call through the media channel.

In an implementation, the transceiver 1201 is configured to receive a 183 message from a call control server, and send a call start event to the application server.

In an implementation, the transceiver 1201 is configured to receive a 200 message from a call control server, and send a call notification message to the application server.

In an implementation, the processor 1202 is configured to obtain user operation information; and the transceiver 1201 is configured to send the user operation information to the application server through the data channel, and receive, through the data channel, second service page information corresponding to the user operation information.

In an implementation, the transceiver 1201 is configured to receive page indication information from the application server through the data channel, where the page indication information indicates the terminal device to display a UI page corresponding to the first service page information or to cache the UI page.

In an implementation, the processor 1202 is configured to display a corresponding UI page based on the first service page information in a manner of covering the call screen. Alternatively, the processor 1202 is configured to display, in a floating window above the call screen, a UI page corresponding to the first service page information.

In an implementation, the transceiver 1201 is configured to send service termination operation information to the application server through the data channel, where the service termination operation information indicates to terminate an interactive service during a call.

In an implementation, the processor 1202 is configured to: when initiating or receiving a call service, establish a data channel between the terminal device and the application server if authentication of the terminal device succeeds.

An embodiment of this application provides a call processing system. The call processing system includes the application server and the terminal device described in the foregoing embodiments.

An embodiment of this application provides a computer-readable storage medium. The computer-readable storage medium stores a program or instructions. When the program or the instructions is/are run on a computer, the computer is enabled to perform the call processing method in embodiments of this application.

An embodiment of this application provides a chip or a chip system. The chip or the chip system includes at least one processor and an interface, the interface is interconnected to the at least one processor through a line, and the at least one processor is configured to run a computer program or instructions, to perform the call processing method in embodiments of this application.

The interface in the chip may be an input/output interface, a pin, a circuit, or the like.

The chip system in the foregoing aspect may be a system on chip (system on chip, SOC), a baseband chip, or the like. The baseband chip may include a processor, a channel encoder, a digital signal processor, a modem, an interface module, and the like.

In an implementation, the chip or the chip system described in this application further includes at least one memory, and the at least one memory stores instructions. The memory may be a storage unit inside the chip, for example, a register or a cache, or may be a storage unit of the chip (for example, a read-only memory and a random access memory).

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A call processing method, wherein the method comprises:
   negotiating, by an application server with a terminal device, establishment of a data channel between the application server and the terminal device in response to detecting initiation of a call service involving the terminal device;
   obtaining, by the application server, first service page information corresponding to the call service, wherein the corresponding first service page information is obtained based on a call start event; and
   sending, by the application server, the first service page information to the terminal device through the data channel in response to detecting connection of the call service.

2. The method according to claim 1, wherein the first service page information comprises a user interface (UI) page element and a control file, or the first service page information comprises resource locators (URL) of the UI page element and the control file.

3. The method according to claim 1, wherein the detecting whether the call service was initiated comprises:
   receiving, by the application server, a call start event from a telephony server, and determining, based on the call start event, whether the terminal device initiated the call service; or
   receiving, by the application server, a data channel establishment request message from the terminal device, and determining, based on the data channel establishment request message, whether the terminal device initiated the call service.

4. The method according to claim 1, wherein the detecting, using the application server, whether the call service is connected comprises:
   receiving, by the application server, a call connection event from a telephony server, and determining, by the application server based on the call connection event, whether the call service is connected; or
   receiving, by the application server, a call notification message from the terminal device, and determining, by the application server based on the call notification message, whether the call service is connected.

5. The method according to claim 3, wherein the obtaining, using the application server, first service page information corresponding to the call service comprises:
   obtaining, by the application server based on the call start event, the first service page information corresponding to the call service.

6. The method according to claim 5, wherein the obtaining, by the application server based on the call start event, the first service page information corresponding to the call service comprises:
   obtaining, by the application server based on a called number comprised in the call start event, the first service page information corresponding to the called number.

7. The method according to claim 1, wherein the method further comprises:
   receiving, by the application server, user operation information from the terminal device through the data channel.

8. The method according to claim 7, wherein the method further comprises:

obtaining, by the application server, second service page information corresponding to the user operation information; and sending, by the application server, the second service page information to the terminal device through the data channel.

9. The method according to claim 7, wherein the method further comprises:
generating, by the application server, audio information based on the user operation information; and
sending, by the application server, the audio information to the call center.

10. The method according to claim 9, wherein the sending, using the application server, the audio information to the call center comprises:
negotiating, by the application server with the call center, establishment of a media channel between the application server and the call center; and
sending, by the application server, the audio information to the call center through the media channel.

11. The method according to claim 1, wherein the method further comprises:
sending, by the application server, page indication information to the terminal device through the data channel, wherein the page indication information instructs the terminal device to display a user interface (UI) page corresponding to the first service page information or to cache the UI page.

12. The method according to claim 10, wherein the negotiating, by the application server with the call center, the establishment of the media channel between the application server and the call center comprises:
serially connecting, by the application server, the terminal device, the application server and the call center to form a media channel between the terminal device and the call center.

13. A call processing method, wherein the method comprises:
negotiating, by a terminal device with an application server, establishment of a data channel between the terminal device and the application server in response to the terminal device initiating or receiving a call service;
receiving, by the terminal device through the data channel, first service page information corresponding to the call service, wherein the corresponding first service page information is obtained based on a call start event; and displaying, by the terminal device, a user interface (UI) page corresponding to the first service page information on a call screen in response to the call service being connected.

14. The method according to claim 13, wherein the first service page information comprises a UI page element and a control file, or the first service page information comprises resource locators (URL) of the UI page element and the control file.

15. The method according to claim 13, wherein the method further comprises:
negotiating, by the terminal device with a call center, establishment of a media channel between the terminal device and the call center, and receiving a media stream of the call service through the media channel.

16. The method according to claim 13, wherein the method further comprises:
receiving, by the terminal device, a 183 message from a call control server, and sending a call start event to the application server.

17. The method according to claim 13, wherein the method further comprises:
receiving, by the terminal device, a 200 message from a call control server, and sending a call notification message to the application server.

18. The method according to claim 13, wherein the method further comprises:
obtaining, by the terminal device, user operation information; and
sending, by the terminal device, the user operation information to the application server through the data channel.

19. The method according to claim 13, wherein the method further comprises:
receiving, by the terminal device, page indication information from the application server through the data channel, wherein the page indication information instructs the terminal device to display the UI page corresponding to the first service page information or to cache the UI page.

20. The method according to claim 13, wherein the displaying, by the terminal device, a UI page corresponding to the first service page information on a call screen comprises:
displaying, by the terminal device in a floating window above the call screen, the UI page corresponding to the first service page information.

* * * * *